(12) United States Patent
Kato et al.

(10) Patent No.: US 11,540,530 B2
(45) Date of Patent: Jan. 3, 2023

(54) OIL-AND-FAT COMPOSITION AND MANUFACTURING METHOD THEREOF

(71) Applicant: TAKASAGO INTERNATIONAL CORPORATION, Tokyo (JP)

(72) Inventors: Daisuke Kato, Hiratsuka (JP); Haruki Otaguro, Hiratsuka (JP); Eiji Emoto, Hiratsuka (JP); Tadahiro Hiramoto, Hiratsuka (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 91 days.

(21) Appl. No.: 16/762,197

(22) PCT Filed: Nov. 9, 2018

(86) PCT No.: PCT/JP2018/041635
§ 371 (c)(1),
(2) Date: May 7, 2020

(87) PCT Pub. No.: WO2019/093466
PCT Pub. Date: May 16, 2019

(65) Prior Publication Data
US 2020/0359644 A1 Nov. 19, 2020

(30) Foreign Application Priority Data
Nov. 9, 2017 (JP) .............................. JP2017-216181

(51) Int. Cl.
| A23D 9/007 | (2006.01) |
| A23L 7/113 | (2016.01) |
| A23L 5/20 | (2016.01) |
| A23L 27/60 | (2016.01) |
| A23L 23/00 | (2016.01) |
| A23C 19/084 | (2006.01) |
| A23C 19/09 | (2006.01) |
| A23D 9/04 | (2006.01) |
| A23F 5/24 | (2006.01) |
| C11B 1/02 | (2006.01) |
| C11B 1/12 | (2006.01) |

(52) U.S. Cl.
CPC ............ *A23D 9/007* (2013.01); *A23C 19/084* (2013.01); *A23C 19/0908* (2013.01); *A23D 9/04* (2013.01); *A23F 5/24* (2013.01); *A23L 5/20* (2016.08); *A23L 7/113* (2016.08); *A23L 23/00* (2016.08); *A23L 27/60* (2016.08); *C11B 1/025* (2013.01); *C11B 1/12* (2013.01); *A23V 2002/00* (2013.01)

(58) Field of Classification Search
CPC ........... A23D 9/007; A23D 9/04; A23L 7/113; A23L 5/20; A23L 27/60; A23L 23/00; A23C 19/084; A23C 19/0908; A23F 5/24; C11B 1/025; C11B 1/12; A23V 2002/00

USPC ......................................................... 426/52
See application file for complete search history.

(56) References Cited

U.S. PATENT DOCUMENTS

| 5,104,672 | A | | 4/1992 | Chen et al. |
| 5,178,892 | A | * | 1/1993 | Simmons ............... A23L 27/201 426/534 |
| 5,811,149 | A | | 9/1998 | Chen et al. |
| 2004/0210070 | A1 | * | 10/2004 | Kruidenberg ........... C11B 3/001 554/205 |
| 2009/0258128 | A1 | | 10/2009 | Saito et al. |
| 2010/0192453 | A1 | * | 8/2010 | Pachauri ................ B01D 3/009 44/445 |

FOREIGN PATENT DOCUMENTS

| CN | 101194704 A | 6/2008 |
| CN | 104187558 A | 12/2014 |
| EP | 0295509 A1 | 12/1988 |
| JP | 60-18577 A | 1/1985 |
| JP | 04-229151 A | 8/1992 |
| JP | 07-188692 A | 7/1995 |
| JP | 3344522 B2 | 11/2002 |
| JP | 2007-110984 A | 5/2007 |
| JP | 4596475 B2 | 12/2010 |
| JP | 2011-223942 A | 11/2011 |
| JP | 2013-121325 A | 6/2013 |
| JP | 5349399 B2 | 11/2013 |

OTHER PUBLICATIONS

Shi et al., Identification of characteristic flavour precursors from enzymatic hydrolysis-mild thermal oxidation tallow by descriptive sensory analysis and gas chromatography-olfactometry and partial least squares regression, Journal of Chromatography B, vols. 913-914, Jan. 15, 2013 (Year: 2013).*

Shi et al., Identification of characteristic flavour precursors from enzymatic hydrolysis-mild thermal oxidation tallow by descriptive sensory analysis and gas chromatography-olfactometry and partial least squares regression, Journal of Chromatography B, vols. 913-914, Jan. 15, 2013, pp. 69-76 (Year: 2013).*

(Continued)

*Primary Examiner* — Brent T O'Hern
(74) *Attorney, Agent, or Firm* — Sughrue Mion, PLLC

(57) ABSTRACT

The purpose of the present invention is to provide: a novel oil-and-fat composition usable as an oil-and-fat sensation imparting material that can impart an oil-and-fat sensation to food and drink at a more natural and moderate intensity or can enhance or improve the oil-and-fat feeling in food and drink, and that can further enhance the flavor or texture that can be sensed in the oral cavity, such as a richness of taste, depth of taste, voluminous feeling, and feeling on the tongue; and a novel manufacturing method therefor. The present invention pertains to an oil-and-fat composition that has a moisture content of less than 1.0 mass % and that includes: component A that is three types of free fatty acids comprising free palmitic acid, free oleic acid, and free stearic acid; and component B that is two types of unsaturated aldehydes comprising 2-decenal and 2-octenal, wherein 0.002-0.2 parts by mass of component B is contained with respect to 100 parts by mass of component A, and at least 8.5 mass % of component A is contained with respect to the total mass of the composition.

6 Claims, No Drawings

(56) References Cited

OTHER PUBLICATIONS

Xiaoxia Shi et al., "Identification of characteristic flavour precursors from enzymatic hydrolysis-mild thermal oxidation tallow by descriptive sensory analysis and gas chromatography-olfactometry and partial least squares regression", Journal of Chromatography B, 2013, pp. 69-76, vol. 913-914.
International Search Report of PCT/JP2018/041635 dated Feb. 5, 2019 [PCT/ISA/210].
A. Ripoche et al., "Determination of fatty acid composition of pork fat by Fourier transform infrared spectroscopy", Meat Science, Jul. 2001, vol. 58, No. 3, pp. 299-304 (6 pages total).
Danian Zheng et al., "Preparation and properties of methyl esters of beef tallow", Bioresource Technology, Aug. 1996, vol. 57, No. 2, pp. 137-142 (6 pages total).

\* cited by examiner

OIL-AND-FAT COMPOSITION AND MANUFACTURING METHOD THEREOF

CROSS REFERENCE TO RELATED APPLICATIONS

This application is a National Stage of International Application No. PCT/JP2018/041635, filed Nov. 9, 2018, claiming priority to Japanese Patent Application No. 2017-216181, filed Nov. 9, 2017.

TECHNICAL FIELD

The present invention relates to a novel oil-and-fat composition which can be used as an ingredient for imparting oily and greasy feeling (an oil and/or fat sensation), and a novel method of producing the same.

BACKGROUND ART

A demand for reduced-fat foods has been increasing in recent years due to an increase in health consciousness. However, there is a problem that the reduction in fat causes a decrease in the savor, texture, mouthfeel, umami, and the like of food. Under such circumstances, in order to improve the unpleasant taste, development of new flavors and the like is in progress which are obtained from highly safe natural materials and the like capable of achieving enhancement of oily and greasy feeling and the like using various natural materials. In addition, flavors which can impart oily and greasy feeling while masking unpleasant tastes in food, and novel taste improvers for further improving savor have been developed.

Patent Literature 1 (Japanese Patent No. 4596475) discloses a taste improver containing, as an active ingredient, a distillate residue obtained by removing low boiling point ingredients from an oxidization-treated animal or vegetable oil and/or fat, and the method of producing the taste improver includes a step of removing a peroxide of the distillate residue. In addition, Patent Literature 2 (Chinese Patent Publication No. 101194704) discloses a method of producing meat savor comprising a step of subjecting beef tallow, lard, chicken oil, sheep tallow (mutton tallow), and the like to lipase treatment and then high temperature heating treatment (150 to 300° C.) in the presence of moisture under an oxygen stream (aeration). In addition, Patent Literature 3 (Japanese Patent No. 5349399) discloses a masking agent for suppressing an unpleasant taste and/or tongue-sticking feeling remaining on the aftertaste of a vegetable oil- and/or fat-containing food and/or beverage containing a free oleic acid derived from a lipase degradation product as an active ingredient, wherein the content ratio of free oleic acid to the total amount of free stearic acid and free oleic acid in the masking agent is 80% to 99.9% in mass ratio. In addition, Patent Literature 4 (Japanese Patent No. 3344522) describes heating an animal or vegetable oil and/or fat and water in the presence of oxygen to generate a flavor, and collecting the exhausted oxygen in a fatty acid triglyceride solution. Patent Document 5 (Japanese Patent Application Publication No. 2013-121325) states that an aldehyde and an unsaturated aldehyde impart a preferred savor derived from a hardened oil.

However, since taste is a sensation created by intertwined complex factors, it is unpredictable what compounds and compositions will lead to a highly balanced savor improving ingredient with good aftertaste while imparting natural oily and greasy feeling. Therefore, the demand for better savor improving ingredients is inexhaustible.

CITATION LIST

Patent Literatures

Patent Literature 1: Japanese Patent No. 4596475
Patent Literature 2: Chinese Patent Publication No. 101194704
Patent Literature 3: Japanese Patent No. 5349399
Patent Literature 4: Japanese Patent No. 3344522
Patent Literature 5: Japanese Patent Application Publication No. 2013-121325

SUMMARY OF INVENTION

Problems to be Solved by the Invention

The present invention aims to provide a novel oil-and-fat composition which can be used as an ingredient for imparting oily and greasy feeling, and a novel method of producing the same. The oil-and-fat composition can impart oily and greasy feeling to a food and/or beverage with more natural and appropriate intensity than conventional taste improvers, flavors, and the like or alternatively can enhance or improve the oily and greasy feeling in the food and/or beverage, and can further enhance the savor and texture felt in the mouth, such as richness, full-bodiness of the taste, volume, and on-tongue texture.

Means for Solution of the Problems

The present inventors conducted earnest studies in order to achieve the above-described object, and have found as a result that it is possible to obtain a composition which can impart an unexpectedly and significantly good savor to a food and/or beverage by subjecting an animal or vegetable oil and/or fat to a combination of lipase treatment, dehydration treatment to a moisture content of less than 1.0% by mass, heat treatment (aeration) at 80° C. or more, and peroxide removal treatment under appropriate conditions. Moreover, the present inventors have also found that, as a result of analyzing the obtained composition, a composition containing a specific free fatty acid and a specific unsaturated aldehyde at specific ratio and proportion can impart unexpectedly and significantly good savor to a food and/or beverage. The present inventors conducted further studies based on these findings, and have finally completed the present invention.

Specifically, the present invention relates to [1] to [10] below.

[1] An oil-and-fat composition having a moisture content of less than 1.0% by mass, comprising the following ingredients A and ingredients B ingredients A: three types of free fatty acids including free palmitic acid, free oleic acid, and free stearic acid, and ingredients B: two types of unsaturated aldehydes including 2-decenal and 2-octenal, wherein the ingredients B are contained at 0.002 to 0.2 parts by mass relative to 100 parts by mass of the ingredients A, and the ingredients A are contained at 8.5% by mass or more relative to a total mass of the composition.

[2] The oil-and-fat composition according to [1] described above, further comprising an animal or vegetable oil and/or fat or an oil and/or fat derived from a fatty acid derivative.

[3] The oil-and-fat composition according to [2] described above, wherein the animal or vegetable oil and/or fat is at least one selected from the group consisting of beef tallow, lard, chicken fat, mutton tallow, milk fat, olive oil, palm oil, rapeseed oil, corn oil, coconut oil, cocoa butter, coffee oil, cod oil, salmon oil, bonito oil, sardine oil, and tuna oil.

[4] A method of producing an oil-and-fat composition, comprising subjecting an animal or vegetable oil and/or fat to:
(a) a step of lipase treatment;
(b) a step of dehydration treatment to a moisture content of less than 1.0% by mass; and
(c) a step of heat treatment at 80° C. or more, wherein the step (b) is performed prior to the step (c), and
(d) a step of peroxide removal treatment may be included after the step (c).

[5] A method of producing an oil-and-fat composition, comprising the steps of:
obtaining a lipase reaction product by subjecting an animal or vegetable oil and/or fat to lipase treatment;
obtaining a heated reaction product by subjecting an animal or vegetable oil and/or fat to dehydration treatment to a moisture content of less than 1.0% by mass and then heat treatment to 80° C. or more; and
mixing the lipase reaction product and the heated reaction product, wherein
the heated reaction product may further be subjected to peroxide removal treatment after the heat treatment.

[6] The method of producing an oil-and-fat composition according to [4] or [5] described above, wherein the animal or vegetable oil and/or fat is at least one selected from the group consisting of beef tallow, lard, chicken fat, mutton tallow, milk fat, olive oil, palm oil, rapeseed oil, corn oil, coconut oil, cocoa butter, coffee oil, cod oil, salmon oil, bonito oil, sardine oil, and tuna oil.

[7] The method of producing an oil-and-fat composition according to any one of [4] to [6] described above, wherein the oil-and-fat composition contains
ingredients A: three types of free fatty acids including free palmitic acid, free oleic acid, and free stearic acid, and
ingredients B: two types of unsaturated aldehydes including 2-decenal and 2-octenal,
the ingredients B are contained at 0.002 to 0.2 parts by mass relative to 100 parts by mass of the ingredients A, and
the ingredients A are contained at 8.5% by mass or more relative to a total mass of the composition.

[8] An oil-and-fat composition obtained by the method according to any one of [4] to [7] described above.

[9] An aroma composition comprising the oil-and-fat composition according to any one of [1] to [3] and [8] described above.

[10] A food and/or beverage comprising the oil-and-fat composition according to any one of [1] to [3] and [8] described above, or the aroma composition according to [9] described above.

Advantageous Effects of Invention

The present invention can provide a novel oil-and-fat composition, and a novel method of producing the same. The oil-and-fat composition can impart oily and greasy feeling to a food and/or beverage with more natural and appropriate intensity than conventional taste improvers, flavors, and the like or alternatively can enhance or improve the oily and greasy feeling in the food and/or beverage.

DESCRIPTION OF EMBODIMENTS

<Oil-and-Fat Composition>

The oil-and-fat composition according to the present invention is required to contain all of the ingredients A: three types of free fatty acids including free palmitic acid, free oleic acid, and free stearic acid, and the ingredients B: two types of unsaturated aldehydes including 2-decenal and 2-octenal. The ingredients B are contained at 0.002 to 0.2 parts by mass, preferably 0.0025 to 0.175 parts by mass, and more preferably 0.005 to 0.165 parts by mass relative to 100 parts by mass of the ingredients A, and the ingredients A are contained at 8.5% by mass or more, preferably 11.0% by mass or more, and more preferably 11.5% by mass or more relative to the total mass of the composition. Note that the upper limit value of the content of the ingredients A is preferably 99% by mass relative to the total mass of the composition. In addition, the ratio between the three types of free fatty acids of the ingredients A is not particularly limited, but any of the free fatty acids is contained in an amount of desirably at least 30% by mass or more when the total mass of the three types of free fatty acids is set to 100% by mass. In addition, the ratio of the two types of unsaturated aldehydes of the ingredients B is not particularly limited, but either one of the unsaturated aldehydes is contained in an amount of desirably at least 30% by mass or more when the total mass is set to 100% by mass.

In addition, the moisture content of the oil-and-fat composition according to the present invention is preferably less than 1.0% by mass, and more preferably less than 0.5% by mass.

The oil-and-fat composition according to the present invention can impart oily and greasy feeling to a food and/or beverage with more natural and appropriate intensity than conventional taste improvers, flavors, and the like or alternatively can enhance or improve the oily and greasy feeling in the food and/or beverage, and can further enhance the savor and texture felt in the mouth, such as richness, full-bodiness of the taste, volume, and on-tongue texture.

In addition, the oil-and-fat composition may contain an animal or vegetable oil and/or fat or an oil and/or fat derived from a fatty acid derivative. The animal or vegetable oil and/or fat is an oil and/or fat selected from animal-derived oils and/or fats and vegetable-derived oils and/or fats, and are not particularly limited. In addition, the animal or vegetable oil and/or fat may be one type of animal or vegetable oil and/or fat, or a mixture of two or more types of animal or vegetable oils and/or fats. Examples of the animal oils and/or fats include lard, beef tallow, milk fat, chicken fat, mutton tallow, egg fat, sardine oil, mackerel oil, whale oil, salmon oil, cod oil, bonito oil, and tuna oil, and examples of the vegetable oils and/or fats include peanut oil, corn oil, olive oil, sesame oil, sunflower oil, coconut oil, palm oil, palm kernel oil, safflower oil, soybean oil, almond oil, rapeseed oil, rice bran oil, coconut oil, wheat germ oil, cottonseed oil, camellia oil, castor oil, and cocoa butter. A preferable animal or vegetable oil and/or fat is at least one selected from the group consisting of beef tallow, lard, chicken fat, mutton tallow, milk fat, olive oil, palm oil, rapeseed oil, corn oil, coconut oil, cocoa butter, coffee oil, cod oil, salmon oil, bonito oil, sardine oil, and tuna oil.

In addition, preferable examples of the oil and/or fat derived from a fatty acid derivative can include metal salts of fatty acids represented by sodium salts of fatty acids and potassium salts of fatty acids, and esters of fatty acids. Among these fatty acid derivatives, triglycerides, monoglycerides, and diglycerides of fatty acids are particularly preferable, and it is possible to use a single one of them or a mixture of two or more of them.

Note that it has been found from the compositions obtained by Production Methods 1 and 2 described below that it is possible to impart unexpectedly good oily and greasy feeling by containing these ingredients A: three types of free fatty acids including free palmitic acid, free oleic acid, and free stearic acid and ingredients B: two types of unsaturated aldehydes including 2-decenal and 2-octenal at specific ratio and proportion.

The method of producing the oil-and-fat composition according to the present invention may be any method, and examples thereof include Production Methods 1 to 3 described below.

<Production Method 1 of Oil-and-Fat Composition>

The present invention relates to a method of producing an oil-and-fat composition, comprising the following steps (a) to (c) to which an animal or vegetable oil and/or fat is subjected:

(a) a step of lipase treatment;
(b) a step of dehydration treatment to a moisture content of less than 1.0% by mass; and
(c) a step of heat treatment at 80° C. or more.

In Production Method 1, it is necessary to subject the animal or vegetable oil and/or fat to all of the steps (a) to (c) each at least once, and the order of the steps is not particularly limited except that the step (b) is performed prior to the step (c). When the step (b) is performed prior to the step (c), as described later, the composition finally obtained has the advantages that it does not generate taste giving undercooked off-flavors or unnatural savors as food, and that trace ingredients contributing to the deliciousness derived from the animal or vegetable oil and/or fat remain. In addition, more preferably, (d) a step of peroxide removal treatment is included after the step (c).

The animal or vegetable oils and/or fats used in Production Methods are oils and/or fats selected from animal-derived oils and/or fats and vegetable-derived oils and/or fats, and are not particularly limited. In addition, the animal or vegetable oil and/or fat may be one type of animal or vegetable oil and/or fat, or a mixture of two or more types of animal or vegetable oils and/or fats. Preferable examples of the animal oils and/or fats include lard, beef tallow, milk fat, chicken fat, mutton tallow, egg fat, sardine oil, mackerel oil, whale oil, salmon oil, cod oil, bonito oil, and tuna oil, and preferable examples of the vegetable oils and/or fats include peanut oil, corn oil, olive oil, sesame oil, sunflower oil, coconut oil, palm oil, palm kernel oil, safflower oil, soybean oil, almond oil, rapeseed oil, rice bran oil, coconut oil, wheat germ oil, cottonseed oil, camellia oil, castor oil, and cocoa butter. The animal or vegetable oil and/or fat is preferably at least one selected from the group consisting of beef tallow, lard, chicken fat, mutton tallow, milk fat, olive oil, palm oil, rapeseed oil, corn oil, coconut oil, cocoa butter, coffee oil, cod oil, salmon oil, bonito oil, sardine oil, and tuna oil.

These animal or vegetable oils and/or fats may be added with a polar solvent in the above steps. Examples of the polar solvent include polyols such as ethylene glycol, propylene glycol, and glycerol, solvents formed by mixing any of the polyols with an aqueous solution having a salt such as sodium chloride or potassium chloride dissolved therein, and water. Among them, it is advantageous to use water. The amount of the polar solvent used in the animal or vegetable oil and/or fat cannot be sweepingly specified because it depends on the type of the animal or vegetable oil and/or fat used. However, it is preferably used in a range of about 0.05 to 5 times the weight of the animal or vegetable oil and/or fat.

<<(a) Step of Lipase Treatment>>

In the present step, the animal or vegetable oil and/or fat or the reaction product of the animal or vegetable oil and/or fat having undergone any of the above steps is added with water in an amount of 0.1 to 1000% by mass and more preferably 5 to 500% by mass, added with lipase, and subjected to reaction. Thereby, the ester bond constituting the lipid is hydrolyzed so that the content of the three types of free fatty acids of the ingredients A in the finally obtained composition becomes 8.5 mass or more. As the reaction conditions, the type and amount of the lipase, the reaction time, the reaction temperature, and the like can be appropriately set by a known method. As the lipase, a commercially available one can be appropriately selected and used. After the reaction, the lipase is inactivated by allowing the reaction product to stand at, for example, about 85° C. for about 30 minutes to 1 hour.

<<(b) Step of Dehydration Treatment to Moisture Content of Less than 1.0% by Mass>>

In the present step, the animal or vegetable oil and/or fat or the reaction product of the animal or vegetable oil and/or fat having undergone any of the above steps is subjected to dehydration treatment to a moisture content of less than 1.0% by mass and preferably less than 0.5% by mass. In the present invention, when the step (b) is performed prior to the step (c), it is possible to obtain an oil-and-fat composition giving natural oily and greasy feeling. The moisture content can be confirmed by, for example, a Karl Fischer measurement method using a Karl Fischer moisture measuring apparatus (manufactured by Metrohm). The method of dehydration treatment is not particularly limited, and examples thereof include a method of removing moisture by bringing an animal or vegetable oil and/or fat or a reaction product thereof into contact with a desiccant such as anhydrous sodium sulfate, anhydrous magnesium sulfate, or Glauber's salt, and a method of separating oil layer and water layer by using ultra high speed centrifugal separator Sharples (manufactured by TOMOE Engineering Co., Ltd.)

<<(c) Step of Heat Treatment at 80° C. or More>>

In the present step, the reaction product having undergone the step (b) is subjected to heat treatment at 80° C. or more under aeration conditions. This step produces two types of unsaturated aldehydes of the ingredients B. It is important in the present invention that the water content is reduced by the step (b) prior to the step (c). When the step (b) is performed in advance, it is possible to obtain the effects that the composition finally obtained has the advantages that it does not generate taste giving undercooked off-flavors or unnatural savors as food, and that trace ingredients contributing to the deliciousness derived from the animal or vegetable oil and/or fat remain. In the present step, the heat treatment is performed preferably at 80 to 150° C., and the heat treatment is performed more preferably at 80 to 130° C. When the heat treatment is performed at a temperature lower than 80° C., there is a concern that a chemical change in the oil and/or fat proceeds slowly, which fails to generate preferable products. When the heat treatment is performed at a temperature higher than 150° C., there is a concern that exposure to high temperature leads to various chemical reactions, which generates undesirable products. Although the aeration conditions are not particularly limited, aeration with an aeration rate of 0.001 vvm to 10 vvm (Volume per Volume per Minutes) is desirable, for example. When the aeration rate is less than 0.001 vvm or more than 10 vvm, the oil-and-fat composition does not contain various volatile ingredients and non-volatile ingredients generated by oxidation of the oil and/or fat at a preferable proportion, providing unnatural oily and greasy feeling. For the purpose of generating two types of unsaturated aldehydes of the ingredients B achieved in the present step, heating conditions such as heating temperature, aeration rate, heating time, and pressure can be appropriately set by a known method.

<<(d) Step of Peroxide Removal Treatment>>

The present step removes a peroxide in the reaction product of the animal or vegetable oil and/or fat having undergone any of the above steps, for example, step (c). In Production Method 1, the present step (d) is preferably performed after the step (c), and more preferably as the last step in Production Method 1. In the present step, the peroxide by-produced in the reaction product is removed by, for example, being stirred while in contact with a known adsorbent and/or while in contact with nitrogen. Examples of the adsorbent include silica gel, acid clay, magnesium silicate, activated carbon, activated clay, and mixtures thereof. In the present step, reaction conditions such as reaction time and temperature can be appropriately set by a known method so that the composition obtained will have a peroxide value of, for example, 5.0 meq/kg or less, and more preferably 2.5 meq/kg or less (the method of measuring the peroxide value is, for example, a value measured in accordance with Standard Methods for the Analysis of Fats, Oils and Related Materials 2.5.2.1 (edited by Japan Oil Chemists' Society)).

<<Oil-and-Fat Composition Obtained by Production Method 1>>

The oil-and-fat composition obtained by the present production method contains ingredients A: three types of free fatty acids including free palmitic acid, free oleic acid, and free stearic acid, and ingredients B: two types of unsaturated aldehydes including 2-decenal and 2-octenal, in which the ingredients B are contained at 0.002 to 0.2 parts by mass, preferably 0.0025 to 0.175 parts by mass, and more preferably 0.005 to 0.165 parts by mass relative to 100 parts by mass of the ingredients A, and the ingredients A are contained at 8.5% by mass or more, preferably 11.0% by mass or more, and more preferably 11.5% by mass or more relative to a total mass of the composition. Note that the upper limit value of the content of the ingredients A is preferably 99% by mass relative to the total mass of the composition. These compositions can be confirmed using, for example, a gas chromatograph apparatus, a high-performance liquid chromatograph apparatus, or the like.

In addition to the above characteristics, the oil-and-fat composition obtained in the present production method has the advantages that it contains almost no taste giving off-flavors or unnatural savors as food, and that trace ingredients contributing to the deliciousness derived from the animal or vegetable oil and/or fat remain. These advantages can only be confirmed by sensory evaluation. This is because taste is a sensation created by exquisitely intertwined complex factors, and there are many ingredients that affect taste but cannot be detected by the current analyzer due to the trace amount. Therefore, the oil-and-fat composition obtained by the present production method is a composition to be specified by the production steps and by the composition that can be confirmed by the current analyzer.

In addition, it is possible to obtain the effects that the oil-and-fat composition obtained in the present production method does not generate taste giving undercooked off-flavors or unnatural savors as food if subjected to the dehydration treatment of the step (b) to a moisture content of less than 1.0% by mass and then to the heat treatment of the step (c). The oil-and-fat composition immediately after being obtained by the present production method has a moisture content of less than 1.0% by mass. However, even when the final product obtained, the oil-and-fat composition, is added with moisture or the like to change the moisture content, it is possible to provide an effect of imparting oily and greasy feeling containing almost no taste giving off-flavors or unnatural savors as food.

<Production Method 2 of Oil-and-Fat Composition>

The present invention relates to a method of producing an oil-and-fat composition, comprising the steps of: obtaining a lipase reaction product by subjecting an animal or vegetable oil and/or fat to lipase treatment; obtaining a heated reaction product by subjecting an animal or vegetable oil and/or fat to dehydration treatment to a moisture content of less than 1.0% by mass and then heat treatment to 80° C. or more, followed by peroxide removal treatment; and mixing the lipase reaction product and the heated reaction product. After the lipase treatment, a dehydration treatment may be performed to a moisture content of preferably less than 1.0% by mass. In addition, it is more preferable to mix the lipase reaction product after subjecting the obtained heated reaction product to a peroxide removal treatment. In addition, after the lipase reaction product and the heated reaction product are mixed, the obtained mixture may be subjected to a peroxide removal treatment.

The animal or vegetable oil and/or fat used as an ingredient can be the same as that used in Production Method 1. The conditions for the lipase treatment and the dehydration treatment in the step of obtaining the lipase reaction product can be set in the same manner as in Production Method 1, and it is preferable to appropriately adjust the conditions for the lipase treatment so that the content of the three types of free fatty acids of the ingredients A in the finally obtained oil-and-fat composition can be set to 8.5% by mass or more. In addition, the conditions for the dehydration treatment, the heat treatment, and the peroxide removal treatment in the step of obtaining the heated reaction product can be set in the same manner as in Production Method 1, and it is preferable to appropriately adjust the conditions for the heat treatment so that the two types of unsaturated aldehydes of the ingredients B in the finally obtained oil-and-fat composition can be set to 0.002 to 0.2 parts by mass relative to 100 parts by mass of the ingredients A.

In the step of mixing the lipase reaction product and the heated reaction product, the content of each reactant can be appropriately adjusted so that the composition of the oil-and-fat composition as shown below is obtained.

<<Oil-and-Fat Composition Obtained by Production Method 2>>

The oil-and-fat composition obtained by the present production method contains ingredients A: three types of free fatty acids including free palmitic acid, free oleic acid, and free stearic acid, and ingredients B: two types of unsaturated aldehydes including 2-decenal and 2-octenal, in which the ingredients B are contained at 0.002 to 0.2 parts by mass, preferably 0.0025 to 0.175 parts by mass, and more preferably 0.005 to 0.165 parts by mass relative to 100 parts by mass of the ingredients A, and the ingredients A are contained at 8.5% by mass or more, preferably 11.0% by mass or more, and more preferably 11.5% by mass or more relative to a total mass of the composition. Note that the upper limit value of the content of the ingredients A is preferably 99% by mass relative to the total mass of the composition. These compositions can be confirmed using, for example, a gas chromatograph apparatus, a high-performance liquid chromatograph apparatus, or the like.

As in the case of the oil-and-fat composition obtained in Production Method 1, the oil-and-fat composition obtained in the present production method has the advantages that it contains almost no taste giving off-flavors or unnatural savors as food, and that trace ingredients contributing to the deliciousness derived from the animal or vegetable oil and/or fat remain. These advantages can only be confirmed by sensory evaluation. This is because taste is a sensation created by exquisitely intertwined complex factors, and there are many ingredients that affect taste but cannot be detected by the current analyzer due to the trace amount. Therefore, it is clear that the oil-and-fat composition obtained by the present production method is a composition to be specified by the production steps and by the composition that can be confirmed by the current analyzer.

In addition, it is possible to obtain the effects that the oil-and-fat composition obtained in the present production method does not generate taste giving undercooked off-flavors or unnatural savors as food if containing the heated reaction product subjected to the dehydration treatment to a moisture content of less than 1.0% by mass and then to the heat treatment. The oil-and-fat composition immediately after being obtained by the present production method can have a moisture content of less than 1.0% by mass. However, even when the final product obtained, the oil-and-fat composition, is added with moisture or the like to change the moisture content, it is possible to provide an effect of imparting oily and greasy feeling containing almost no taste giving off-flavors or unnatural savors as food.

<Production Method 3 of Oil-and-Fat Composition>

In the present invention, it is possible to mix the ingredients A: three types of free fatty acids including free palmitic acid, free oleic acid, and free stearic acid, and the ingredients B: two types of unsaturated aldehydes including 2-decenal and 2-octenal in a base oil such as a medium chain fatty acid, to thereby obtain the oil-and-fat composition according to the present invention. In this case, the ingredients B are contained at 0.002 to 0.2 parts by mass, preferably 0.0025 to 0.175 parts by mass, and more preferably 0.005 to 0.165 parts by mass relative to 100 parts by mass of the ingredients A, and the ingredients A are contained at 8.5% by mass or more, preferably 11.0% by mass or more, and more preferably 11.5% by mass or more relative to the total mass of the composition. Note that the upper limit value of the content of the ingredients A is preferably 99% by mass relative to the total mass of the composition.

The base oil is not particularly limited as long as it can dissolve the above five types of compounds and is an edible oil and/or fat. For example, medium chain fatty acid (MCT), triacetin, and the like can be used.

<Aroma Composition>

The present invention also provides an aroma composition containing the above-described oil-and-fat composition. The concentration of the oil-and-fat composition in the aroma composition can be appropriately determined according to the properties and required effects of the target aroma composition.

The aroma composition of the present invention can be obtained by adding the oil-and-fat composition to a certain aroma which requires improvement in aroma intensity and/or aroma quality. Examples of the certain aroma as the target of the present invention include mint flavor, chocolate flavor, vanilla flavor, citrus flavors such as orange flavor, lemon flavor, grapefruit flavor, and yuzu flavor, pineapple flavor, banana flavor, mango flavor, apple flavor, grape flavor, peach flavor, Muscat flavor, strawberry flavor, blueberry flavor, cassis flavor, Japanese apricot flavor, coffee flavor, caramel flavor, sugar flavor, honey flavor, green tea flavor, black tea flavor, oolong tea flavor, drink flavor, rum flavor, soda flavor, cola flavor, curry flavor, stew flavor, hashed beef rice flavor, soup flavor, dressing flavor, sauce flavor, milk flavor, cheese flavor, butter flavor, yogurt flavor, sour cream flavor, cream flavor, beef flavor, pork flavor, chicken flavor, onion flavor, ginger flavor, garlic flavor, spice flavor, sausage flavor, consomme flavor, pickle flavor, vinegar flavor, soy sauce flavor, fish flavor, teriyaki flavor, tonkotsu flavor, ramen flavor, kimchi flavor, demi-glace flavor, and Chinese cuisine flavor.

The aroma composition of the present invention may contain various types of compounding ingredients and/or additives. The compounding ingredients and additives which can be mixed are not particularly limited, and examples thereof include antioxidants, preservatives, antibacterial agents, and pH adjusters. The above-described compounding ingredients and additives may be used in any combination of two or more kinds.

More specifically, examples of the antioxidants include butylhydroxytoluene, butylhydroxyanisole, citric acid, glutathione, selenium, lycopene, vitamin A, vitamin E, and vitamin C as well as pyrrolopyrrole derivatives, free radical scavengers obtained from extracts from various plants, and enzymes having antioxidant properties such as superoxide dismutase and glutathione peroxidase.

In addition, examples of the preservatives and the antibacterial agents include benzoic acid, sodium benzoate, isopropyl paraoxybenzoate, isobutyl paraoxybenzoate, ethyl parahydroxybenzoate, methyl parahydroxybenzoate, butyl paraoxybenzoate, propyl paraoxybenzoate, sodium sulfite, sodium hyposulfite, potassium pyrosulfite, sorbic acid, potassium sorbate, sodium dehydroacetate, thujaplicins, *Aralia cordata* extract, *Styrax japonicus* extract, *Artemisia capillaris* extract, oolong tea extract, milt protein extract, enzymatically degraded Job's teats extract, tea catechins, apple polyphenol, pectin degradation product, chitosan, lysozyme, and ε-polylysine.

In addition, examples of the pH adjusters include adipic acid, citric acid, trisodium citrate, glucono delta-lactone, gluconic acid, potassium gluconate, sodium gluconate, DL-tartaric acid, L-tartaric acid, DL-potassium hydrogen tartrate, L-potassium hydrogen tartrate, DL-sodium tartrate, L-sodium tartrate, potassium carbonate (anhydrous), sodium hydrogen carbonate, sodium carbonate, carbon dioxide, lactic acid, sodium lactate, glacial acetic acid, disodium dihydrogen pyrophosphate, fumaric acid, monosodium fumarate, DL-malic acid, DL-sodium malate, phosphoric acid, dipotassium hydrogen phosphate, potassium dihydrogen phosphate, disodium hydrogen phosphate, and sodium dihydrogen phosphate.

<Food and/or Beverage>

The present invention also provides a food and/or beverage containing the above-described oil-and-fat composition or aroma composition. Those skilled in the art can appropriately determine the concentration of the oil-and-fat composition or aroma composition in the food and/or beverage according to the properties and required effects of the target food and/or beverage.

Although there is no intention of limiting, examples of the food and/or beverage include fruit beverages, fruit juice beverages, fruit juice free beverages, vegetable beverages, carbonated beverages, sports drinks, coffee beverages, tea, black tea, oolong tea, mineral beverages, yogurt beverages, milk beverages, lactic acid bacteria beverages, energy drinks, alcoholic beverages, non-alcoholic beverages, soups (such as chicken soup and Japanese corn soup), liquid products such as noodle soup base, candies, chewing gums, tablets, gummies, jellies, chocolates, baked goods such as cookies and cakes, cotton candies, bread, ice creams, frozen desserts, hams, sausages, snacks, seasonings such as powder sauce, oils and/or fats such as butter and margarine, dairy products such as cheese, retort beef bowl, instant noodles, solid products such as edible sheet food, curry, stew, hashed beef rice, sauces (salmon cream sauce, carpaccio sauce, mayonnaise sauce), tare sauces, dressing, fresh cream, cream, jam, ice creams, and semi-solid and fluid products such as liquid food.

The food and/or beverage targeted by the present invention may contain various compounding ingredients and additives commonly used in foods and/or beverages. In addition to the above-described antioxidants, preservatives, antibacterial agents, and pH adjusters, examples include sweeteners, acidulants, extenders, colors, emulsifiers, functional substances, savor improvers, milk ingredients, nitrogen-containing compounds such as amino acids and peptides, various flavor ingredients, and various flavors. These compounding ingredients and additives may be used in any combination of two or more kinds.

More specifically, examples of the sweeteners include sugar, fructose, lactose, glucose, palatinose, maltose, trehalose, sorbitol, erythritol, maltitol, reduced palatinose, xylitol, lactitol syrup, oligosaccharide, aspartame, sucralose, acesulfame potassium, saccharin, sodium saccharin, stevia, stevia extract, stevioside, neotame, alitame, thaumatin, neohesperidin dihydrochalcone, paramethoxycinnamic aldehyde, perillartine, and licorice.

Examples of the acidulants include acetic acid, lactic acid, and citric acid.

Examples of the extenders include saccharides, polysaccharides, modified starch, casein, gelatin, carboxymethyl cellulose, and lecithin.

Examples of the colors include natural colors and organically synthesized colors, and specific examples thereof include hibiscus color, huckleberry color, plum color, non seaweed color, dewberry color, grape juice color, blackberry color, blueberry color, mulberry color, Morello cherry color, red currant color, loganberry color, paprika powder, malt extract, rutin, flavonoid, red cabbage color, red radish color, adzuki color, turmeric color, olive tea, cowberry color, chlorella powder, saffron color, perilla color, strawberry color, chicory color, pecan nut color, Monascus color, safflower color, purple-fleshed sweet potato color, lac color, spirulina color, onion color, tamarind color, capsicum color, gardenia color, caramel color, Lithospermum root color, rosewood color, krill color, orange color, carrot carotene, Blue No. 1, Yellow No. 4, and Green No. 3.

Examples of the emulsifiers include fatty acid monoglyceride, fatty acid diglyceride, fatty acid triglyceride, propylene glycol fatty acid esters, sucrose fatty acid esters, polyglycerin fatty acid esters, lecithin, enzyme-treated lecithin, starch, modified starch, dextrin, sorbitan fatty acid esters, *Quillaia* extract, gum arabic, gum tragacanth, guar gum, gum karaya, xanthan gum, pectin, alginic acid and salts thereof, carrageenan, gelatin, and casein.

The functional substances mean substances having a nutritional function or a bioregulatory function, and examples thereof include animal or vegetable oils and/or fats such as docosahexaenoic acid (DHA), eicosapentaenoic acid (EPA), DHA- and/or EPA-containing fish oil, linoleic acid, γ-linolenic acid, α-linolenic acid, lecithin, and diacylglycerol, and derivatives thereof, animal or plant extracts such as rosemary, sage, perilla oil, chitin, chitosan, royal jelly, and propolis, vitamins such as vitamin A, vitamin D, vitamin E, vitamin F, vitamin K, coenzyme Q10, and α-lipoic acid, coenzymes and derivatives thereof, polyphenols such as γ-oryzanol, catechin, anthocyanin, isoflavone, rutin, chlorogenic acid, and theaflavin, dietary fibers such as indigestible dextrin, carbohydrates such as palatinose, xylitol, and oligosaccharides, salts such as calcium citrate malate (CCM), milk protein-derived substances such as casein phosphopeptides, lactoferrin, and milky peptides, lactic acid bacteria, heme iron, fluorides such as sodium fluoride, potassium fluoride, stannous fluoride, strontium fluoride, and sodium monofluorophosphate, water-soluble phosphate compounds such as potassium and sodium salts of orthophosphoric acid, tranexamic acid, epsilon aminocaproic acid, dl-tocophenol acetate, α-bisabolol, dihydrocholesterol, chlorhexidine salts, azulene, glycyrrhetin, glycyrrhetinic acid, glycyrrhizin, and salts thereof, chelating phosphate compounds such as sodium copper chlorophyllin, chlorophyll, and glycerophosphate, copper compounds such as copper gluconate, aluminum lactate, strontium chloride, potassium nitrate, hydroxamic acid and derivatives thereof, sodium tripolyphosphate, methoxy ethylene maleic anhydride copolymer, epidihydrocholesterin, allantoin chloro-hydroxy aluminum, ascorbic acid, lysozyme chloride, isopropyl methylphenol, benzethonium chloride, cetylpyridinium chloride, trichlorocarbanilide, zinc citrate, and Phellodendron bark extract.

Examples of the milk ingredients include raw milk, cow's milk, whole milk powder, skim milk powder, fresh cream, milk proteins such as casein and whey, those derived from milk of goats, sheep, and the like, and degradation products thereof.

Examples of the savor improving ingredients include sucralose, cyclodextrin, theanine, hesperidin glycoside, and sugarcane extract.

Examples of the nitrogen-containing compounds such as amino acids and peptides include alanine, arginine, asparagine, aspartic acid, cysteine, cystine, glutamine, glutamic acid, glycine, histidine, leucine, isoleucine, lysine, methionine, phenylalanine, proline, serine, threonine, tryptophan, tyrosine, valine, γ-aminobutyric acid, ornithine, citrulline, creatine, theanine, dipeptides such as carnosine and anserine, tripeptides typified by glutathione, soybean peptides, fish peptides, milk peptides, and whey peptides.

As the various flavor ingredients, natural aromas, natural essential oils, and various synthetic aromas can be used, for example. These aromas are not particularly limited as long as they can be used in foods and/or beverages, and examples thereof include esters, aldehydes, (thio) ethers, alcohols, ketones, lactones, carboxylic acids, aliphatic hydrocarbons, nitrogen-containing heterocyclic compounds, sulfur-containing heterocyclic compounds, amines, thiols, phenols, and essential oils.

Specific examples of compounds include acetaldehyde, ethyl acetoacetate, acetophenone, anethole, anisaldehyde, amyl alcohol, α-amylcinnamaldehyde, allyl cyclohexane propionate, methylanthranilate, ambrettolide, ionone, isoamyl alcohol, isoeugenol, isoamyl isovalerate, ethyl isovalerate, isothiocyanates, allyl isothiocyanate, isovaleraldehyde, isobutanol, isobutyraldehyde, isopropanol, isopentylamine, indole and derivatives thereof, γ-undecalactone, ethyl acetate, the mixture of 2-ethyl-3,5-dimethylpyrazine and 2-ethyl-3,6-dimethylpyrazine, ethylthioacetate, ethylvanillin, 2-ethylpyrazine, ethyl butyrate, 2-ethyl-3-methylpyrazine, 2-ethyl-5-methylpyrazine, 5-ethyl-2-methylpyrazine, ethyl methylphenylglycidate, ethyl lactate, eugenol, octanal, ethyl octanoate, capsaicin, carvyl acetate, carbon, isoamyl formate, geranyl formate, citronellyl formate, cinnamic acid, ethyl cinnamate, methyl cinnamate, geraniol, isoamyl acetate, ethyl acetate, geranyl acetate, cyclohexyl acetate, citronellyl acetate, cinnamyl acetate, terpinyl acetate, phenethyl acetate, butyl acetate, benzyl acetate, 1-menthyl acetate, linalyl acetate, ethyl salicylate, methyl salicylate, 2,3-diethyl-5-methylpyrazine, allyl cyclohexyl propionate, citral, citronellal, citronellol, 1,8-cineole, dimethyl sulfide, 2,3-dimethylpyrazine, 2,5-dimethylpyrazine, 2,6-dimethylpyrazine, 2,6-dimethylpyridine, gingerol, cinnamyl alcohol, cinnamaldehyde, spilanthol, thymol, decanal, decanol, ethyl decanoate, 5,6,7,8-tetrahydroquinoxaline, 2,3,5,6-tetramethylpyrazine, terpineol, 2,3,5-trimethylpyrazine, γ-nonalactone, vanillyl butyl ether, vanillin, para-methyl acetophenone, valeraldehyde, hydroxycitronellal, hydroxycitronellal dimethyl acetal, pinen, piperidine, piperine, piperonal pyrazine, pyrrolidine, isoamyl phenylacetate, isobutyl phenylacetate, ethyl phenylacetate, 2-(3-phenylpropyl)pyridine, phenethylamine, phenoxyethyl isobutyrate, fenchone, butanol, butylamine, butyraldehyde, furfural and derivatives thereof, pulegone, propanol, propionaldehyde, propionic acid, isoamyl propionate, ethyl propionate, benzyl propionate, hexanoic acid, allyl hexanoate, ethyl hexanoate, hexanal, hexenol, ethyl heptanoate, perillaldehyde, benzyl alcohol, benzaldehyde, 2-pentanol, 1-penten-3-ol, d-borneol, maltol, methylanthranilate, methyl N-methylanthranilate, methyl epi-jasmonate, 5-methylquinoxaline, 6-methylquinoline, 5-methyl-6,7-dihydro-5H-cyclopentapyrazine, methyl β-naphthyl ketone, 2-methylpyrazine, 2-methylbutanol, 3-methyl-2-butanol, 2-methylbutyraldehyde, 3-methyl-2-butenal, 3-methyl-2-butenol, menthyl acetate, menthol isomers such as 1-menthol, menthone, butyric acid, isoamyl butyrate, ethyl butyrate, cyclohexyl butyrate, butyl butyrate, gamma- and delta-lactones having 4 to 12 carbon atoms, linalyl acetate, linalool, and limonene.

Specific examples of the essential oils include anise oil, star anise oil, bergamot oil, *Ocimum basilicum* oil, laurel leaf West Indian oil, galbanum oil, apple oil, apricot oil, cassia oil, camphor oil, buchu leaf oil, cardamom seed oil, cassia bark oil, Roman chamomile flower oil, cinnamon bark oil, cinnamon leaf oil, clove bud oil, cognac green oil, cilantro oil, cubeba oil, caraway oil, fennel sweet oil, garlic oil, ginger oil, petitgrain oil, lemon oil, lime oil, orange oil, citrus oil, cedar oil, citronella oil, patchouli oil, eucalyptus oil, bay oil, grapefruit oil, mandarin oil, sandalwood oil, pine nut oil, rose oil, ylang-ylang oil, tangerine oil, geranium oil, wintergreen oil, clove oil, thyme oil, sage oil, cardamom oil, coriander oil, lime oil, citron oil, lavender oil, rosemary oil, laurel oil, perilla oil, chamomile oil, caraway oil, marjoram oil, celery oil, bay oil, Origanum oil, pine needle oil, neroli oil, jasmine oil, patchouli oil, paracress oil, orris concrete, rose absolute, orange flower absolute, vanilla absolute, patchouli absolute, and processed products thereof (such as cutting of pre-distillate, cutting of post-distillate, fractionation, liquid-liquid extraction, essence, and formation into powdered aroma).

Examples of the various flavors include mint flavor, chocolate flavor, vanilla flavor, citrus flavors such as orange flavor, lemon flavor, grapefruit flavor, and yuzu flavor, pineapple flavor, banana flavor, mango flavor, apple flavor, grape flavor, peach flavor, Muscat flavor, strawberry flavor, blueberry flavor, cassis flavor, Japanese apricot flavor, coffee flavor, caramel flavor, sugar flavor, honey flavor, green tea flavor, black tea flavor, oolong tea flavor, drink flavor, rum flavor, soda flavor, cola flavor, curry flavor, stew flavor, hashed beef rice flavor, soup flavor, dressing flavor, sauce flavor, milk flavor, cheese flavor, butter flavor, yogurt flavor, sour cream flavor, cream flavor, beef flavor, pork flavor, chicken flavor, onion flavor, ginger flavor, garlic flavor, spice flavor, sausage flavor, consomme flavor, pickle flavor, vinegar flavor, soy sauce flavor, fish flavor, teriyaki flavor, tonkotsu flavor, ramen flavor, kimchi flavor, demi-glace flavor, and Chinese cuisine flavor.

Hereinafter, the present invention is described in more detail with reference to Examples, but the present invention is not limited to these Examples.

EXAMPLES

The operations and effects of the oil-and-fat compositions produced in the following Examples and Comparative Examples were verified by sensory evaluation conducted by 10 expert panelists through calculating the average scores of oily and greasy feeling and palatability. The sensory evaluation was based on the criteria presented in Table 1-1 below. The "1 point" in the evaluation is a rating when no ingredient was added (no addition).

In addition, 0.025% of the oil-and-fat composition prepared in advance in Tests 1 to 7 was added to commercially available retort curry, and the specialized panelists selected were those who were able to grasp the difference from Test 1 (containing none of the five types of compounds) added product.

TABLE 1-1

(Results of Oily and Greasy Feeling Enhancement Evaluation)

5 Points: Imparted with oily and greasy feeling to a great extent
4 Points: Imparted with oily and greasy feeling to a sufficient extent
3 Points: Imparted with oily and greasy feeling
2 Points: Imparted with oily and greasy feeling to a slight extent
1 Point: Almost no oily and greasy feeling
(Results of Palatability Evaluation)

5 Points: Excellent (very delicious)
4 Points: Satisfactory (delicious)
3 Points: Rather good (rather delicious)
2 Points: Difference was felt (good taste was felt a little)
1 Point: No change (same as no addition)
0 Points: Bad (bad taste)

TABLE 1-2

| | | Test 1 | Test 2 | Test 3 | Test 4 | Test 5 | Test 6 | Test 7 |
|---|---|---|---|---|---|---|---|---|
| Ingredients A | Palmitic Acid | — | 1.0 | 2.5 | 5.0 | — | — | — |
| | Stearic Acid | — | 1.0 | 2.5 | 5.0 | — | — | — |
| | Oleic Acid | — | 1.0 | 2.5 | 5.0 | — | — | — |
| Ingredients B | 2-Octenal | — | — | — | — | 0.00001 | 0.00003 | 0.0001 |
| | 2-Decenal | — | — | — | — | 0.00001 | 0.00003 | 0.0001 |
| MCT | | 100.00 | 97.00 | 92.50 | 85.00 | 99.99998 | 99.99994 | 99.9998 |
| sum | | 100 | 100 | 100 | 100 | 100 | 100 | 100 |
| Ingredients A (% by Mass) | | — | 3 | 7.5 | 15 | — | — | — |
| Ingredients B/Ingredients A × 100 | | — | — | — | — | — | — | — |

In addition, Experiments 1, 2, and 4 verify the effect obtained by employing the configuration of the oil-and-fat composition according to the present invention, and Experiment 3 verifies the effect obtained by subjecting the animal or vegetable oil and/or fat in the oil-and-fat composition according to the present invention to all of the (a) step of lipase treatment, the (b) step of dehydration treatment to a moisture content of less than 1.0% by mass, the (c) step of heat treatment at 80° C. or more, and the (d) step of peroxide removal treatment.

<Experiment 1> Experiment to Examine the Usefulness of Containing all of the Free Fatty Acids of the Ingredients a and the Unsaturated Aldehydes of the Ingredients B Prepared were free palmitic acid (manufactured by Junsei Chemical Co., Ltd., powder form), free stearic acid (manufactured by Junsei Chemical Co., Ltd., powder form), free oleic acid (manufactured by Tokyo Chemical Industry Co., Ltd., liquid form), 2-octenal (manufactured by Tokyo Chemical Industry Co., Ltd., liquid form), 2-decenal (manufactured by Tokyo Chemical Industry Co., Ltd., liquid form), and MCT (manufactured by The Nisshin OilliO Group, Ltd., liquid form). Then, based on MCT, oil-and-fat compositions were prepared with the compositions presented in Table 2-1 and Table 2-2 (in the tables, sum means the total mass, and the unit is mass (g)). Then, the usefulness of keeping the concentrations of free fatty acids and unsaturated aldehydes constant and preparing all of the free fatty acids of the ingredients A and the unsaturated aldehydes of the ingredients B was examined.

[Sensory Evaluation]

To commercially available retort curry, 0.025% by mass of each of the compositions of Example 1 and Comparative Examples 1 to 12 was added, and sensory evaluation was performed by 10 specialized panelists. Table 2-3 below presents the results. In addition, Table 2-4 and Table 2-5 present the score by each specialized panelist. It can be understood from Table 2-4 and Table 2-5 that the degree of evaluation among the panelists is almost common.

TABLE 2-3

|  | Oily and Greasy Feeling | Palatability |
| --- | --- | --- |
| Comparative Example 1 | 2.5 | 2.3 |
| Comparative Example 2 | 2.4 | 2.2 |
| Comparative Example 3 | 2.7 | 2.8 |
| Comparative Example 4 | 2.6 | 2.6 |
| Comparative Example 5 | 2.5 | 2.4 |
| Comparative Example 6 | 2.9 | 2.7 |
| Comparative Example 7 | 2.3 | 2.4 |
| Example 1 | 4.6 | 4.4 |
| Comparative Example 8 | 2.2 | 2.1 |
| Comparative Example 9 | 2.2 | 2.2 |
| Comparative Example 10 | 2.1 | 2.2 |
| Comparative Example 11 | 2.2 | 2.3 |
| Comparative Example 12 | 2.3 | 2.7 |

TABLE 2-1

|  |  | Comparative Example 1 | Comparative Example 2 | Comparative Example 3 | Comparative Example 4 | Comparative Example 5 | Comparative Example 6 | Comparative Example 7 | Example 1 |
| --- | --- | --- | --- | --- | --- | --- | --- | --- | --- |
| Ingredients A | Palmitic Acid | 45.0 | — | — | — | 22.5 | 15.0 | — | 15.0 |
|  | Stearic Acid | — | 45.0 | — | 22.5 | 22.5 | 15.0 | — | 15.0 |
|  | Oleic Acid | — | — | 45.0 | 22.5 | — | 15.0 | — | 15.0 |
| Ingredients B | 2-Octenal | — | — | — | — | — | — | 0.0015 | 0.0015 |
|  | 2-Decenal | — | — | — | — | — | — | 0.0015 | 0.0015 |
| MCT |  | 55.00 | 55.00 | 55.00 | 55.00 | 55.00 | 55.00 | 99.997 | 54.997 |
| sum |  | 100 | 100 | 100 | 100 | 100 | 100 | 100 | 100 |
| Ingredients A (% by Mass) |  | 45 | 45 | 45 | 45 | 45 | 45 | — | 45 |
| Ingredients B/Ingredients A × 100 |  | — | — | — | — | — | — | — | 0.0067 |

TABLE 2-2

|  |  | Comparative Example 8 | Comparative Example 9 | Comparative Example 10 | Comparative Example 11 | Comparative Example 12 |
| --- | --- | --- | --- | --- | --- | --- |
| Ingredients A | Palmitic Acid | — | — | 15.0 | — | — |
|  | Stearic Acid | — | — | — | 15.0 | — |
|  | Oleic Acid | — | — | — | — | 15.0 |
| Ingredients B | 2-Octenal | — | 0.0030 | — | — | — |
|  | 2-Decenal | 0.0030 | — | — | — | — |
| MCT |  | 99.997 | 99.997 | 85.00 | 85.00 | 85.00 |
| sum |  | 100 | 100 | 100 | 100 | 100 |
| Ingredients A (% by Mass) |  | 0 | 0 | 15 | 15 | 15 |
| Ingredients B/Ingredients A × 100 |  | — | — | — | — | — |

TABLE 2-4

Oily and Greasy Feeling

| Panelist | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| 1 | 2.0 | 2.0 | 3.0 | 2.0 | 2.0 | 3.0 | 3.0 |
| 2 | 2.0 | 2.0 | 3.0 | 2.0 | 2.0 | 3.0 | 2.0 |
| 3 | 2.0 | 3.0 | 2.0 | 3.0 | 3.0 | 2.0 | 2.0 |
| 4 | 3.0 | 2.0 | 2.0 | 3.0 | 2.0 | 3.0 | 2.0 |
| 5 | 2.0 | 3.0 | 2.0 | 3.0 | 3.0 | 3.0 | 2.0 |
| 6 | 2.0 | 2.0 | 3.0 | 3.0 | 3.0 | 3.0 | 2.0 |
| 7 | 3.0 | 3.0 | 2.0 | 2.0 | 2.0 | 3.0 | 3.0 |
| 8 | 3.0 | 2.0 | 3.0 | 2.0 | 3.0 | 3.0 | 2.0 |
| 9 | 3.0 | 2.0 | 4.0 | 3.0 | 2.0 | 4.0 | 2.0 |
| 10 | 3.0 | 3.0 | 3.0 | 3.0 | 3.0 | 2.0 | 3.0 |
| Avg Value | 2.5 | 2.4 | 2.7 | 2.6 | 2.5 | 2.9 | 2.3 |

| Panelist | Example 1 | Comparative Example 8 | Comparative Example 9 | Comparative Example 10 | Comparative Example 11 | Comparative Example 12 |
|---|---|---|---|---|---|---|
| 1 | 5.0 | 2.0 | 3.0 | 2.0 | 2.0 | 2.0 |
| 2 | 5.0 | 3.0 | 2.0 | 2.0 | 2.0 | 2.0 |
| 3 | 5.0 | 2.0 | 2.0 | 1.0 | 1.0 | 2.0 |
| 4 | 5.0 | 3.0 | 2.0 | 2.0 | 2.0 | 3.0 |
| 5 | 4.0 | 2.0 | 2.0 | 2.0 | 2.0 | 2.0 |
| 6 | 5.0 | 2.0 | 2.0 | 3.0 | 2.0 | 3.0 |
| 7 | 4.0 | 2.0 | 2.0 | 2.0 | 3.0 | 2.0 |
| 8 | 4.0 | 2.0 | 2.0 | 2.0 | 3.0 | 2.0 |
| 9 | 5.0 | 2.0 | 2.0 | 3.0 | 3.0 | 2.0 |
| 10 | 4.0 | 2.0 | 3.0 | 2.0 | 2.0 | 3.0 |
| Avg Value | 4.6 | 2.2 | 2.2 | 2.1 | 2.2 | 2.3 |

TABLE 2-5

Oily and Greasy Feeling

| Panelist | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| 1 | 2.0 | 2.0 | 3.0 | 3.0 | 2.0 | 3.0 | 2.0 |
| 2 | 2.0 | 2.0 | 3.0 | 3.0 | 2.0 | 3.0 | 2.0 |
| 3 | 2.0 | 2.0 | 2.0 | 3.0 | 2.0 | 2.0 | 2.0 |
| 4 | 2.0 | 2.0 | 3.0 | 2.0 | 3.0 | 3.0 | 2.0 |
| 5 | 2.0 | 2.0 | 2.0 | 3.0 | 2.0 | 2.0 | 3.0 |
| 6 | 2.0 | 2.0 | 3.0 | 3.0 | 2.0 | 3.0 | 2.0 |
| 7 | 3.0 | 2.0 | 3.0 | 2.0 | 3.0 | 3.0 | 3.0 |
| 8 | 3.0 | 3.0 | 3.0 | 2.0 | 2.0 | 3.0 | 3.0 |
| 9 | 2.0 | 2.0 | 3.0 | 3.0 | 3.0 | 2.0 | 3.0 |
| 10 | 3.0 | 3.0 | 3.0 | 2.0 | 3.0 | 3.0 | 2.0 |
| Avg Value | 2.3 | 2.2 | 2.8 | 2.6 | 2.4 | 2.7 | 2.4 |

| Panelist | Example 1 | Comparative Example 8 | Comparative Example 9 | Comparative Example 10 | Comparative Example 11 | Comparative Example 12 |
|---|---|---|---|---|---|---|
| 1 | 4.0 | 2.0 | 2.0 | 2.0 | 2.0 | 2.0 |
| 2 | 4.0 | 2.0 | 2.0 | 2.0 | 2.0 | 2.0 |
| 3 | 4.0 | 1.0 | 2.0 | 1.0 | 2.0 | 2.0 |
| 4 | 4.0 | 2.0 | 2.0 | 2.0 | 3.0 | 3.0 |
| 5 | 5.0 | 2.0 | 3.0 | 2.0 | 3.0 | 3.0 |
| 6 | 5.0 | 2.0 | 2.0 | 2.0 | 3.0 | 3.0 |
| 7 | 4.0 | 2.0 | 2.0 | 2.0 | 2.0 | 3.0 |
| 8 | 5.0 | 3.0 | 3.0 | 3.0 | 2.0 | 3.0 |
| 9 | 5.0 | 2.0 | 2.0 | 3.0 | 2.0 | 3.0 |
| 10 | 4.0 | 3.0 | 2.0 | 3.0 | 2.0 | 3.0 |
| Avg Value | 4.4 | 2.1 | 2.2 | 2.2 | 2.3 | 2.7 |

This experiment has demonstrated that, in the case of containing all of the free fatty acids of the ingredients A and the unsaturated aldehydes of the ingredients B, it is possible to impart food with specifically high oily and greasy feeling.

<Experiment 2> Experiment to Examine the Usefulness of Setting the Content Ratio and Proportion of the Free Fatty Acids of the Ingredients a and the Unsaturated Aldehydes of the Ingredients B Free palmitic acid, free stearic acid, free oleic acid, 2-octenal, 2-decenal, and MCT were prepared as in Experiment 1.

Then, based on MCT, oil-and-fat compositions were prepared with the compositions presented in Table 3-1 (in the table, sum means the total mass, and the unit is mass (g)). Then, the usefulness of the fact was examined that the scope of the present invention includes the proportion of the ingredients B relative to 100 parts by mass of the ingredients A and the content of the ingredients A relative to the total mass of the composition. Note that, in Table 3-1, the bold characters for Comparative Examples are numerical values that do not satisfy the requirements of the present invention.

TABLE 3-1

|  |  | Example 2 | Example 3 | Comparative Example 13 | Example 4 | Comparative Example 14 | Example 5 | Example 6 | Comparative Example 15 |
|---|---|---|---|---|---|---|---|---|---|
| Ingredients A | Palmitic Acid | 15.0 | 15.0 | 15.0 | 15.0 | 15.0 | 25.0 | 5.0 | 2.5 |
|  | Stearic Acid | 15.0 | 15.0 | 15.0 | 15.0 | 15.0 | 25.0 | 5.0 | 2.5 |
|  | Oleic Acid | 15.0 | 15.0 | 15.0 | 15.0 | 15.0 | 25.0 | 5.0 | 2.5 |
| Ingredients B | 2-Octenal | 0.0015 | 0.015 | 0.150 | 0.030 | 0.060 | 0.060 | 0.0015 | 0.0015 |
|  | 2-Decenal | 0.0015 | 0.015 | 0.150 | 0.030 | 0.060 | 0.060 | 0.0015 | 0.0015 |
| MCT |  | 55.00 | 54.97 | 54.70 | 54.94 | 54.88 | 24.88 | 85.00 | 92.50 |
| sum |  | 100 | 100 | 100 | 100 | 100 | 100 | 100 | 100 |
| Ingredients A (% by Mass) |  | 45 | 45 | 45 | 45 | 45 | 75 | 15 | 7.5 |
| Ingredients B/Ingredients A × 100 |  | 0.0067 | 0.0667 | 0.6667 | 0.1333 | 0.2667 | 0.1600 | 0.0200 | 0.0400 |

[Sensory Evaluation]

Commercially available cheese risotto base was heated and dissolved in boiling water, and then the compositions of Examples 2 to 6 and Comparative Examples 13 to 15 were each added in an amount of 0.025%, and sensory evaluation was performed by 10 specialized panelists. Table 3-2 below presents the results. In addition, Table 3-3 and Table 3-4 present the score by each specialized panelist. It can be understood from Table 3-3 and Table 3-4 that the degree of evaluation among the panelists is almost common.

TABLE 3-2

|  | Oily and Greasy Feeling | Palatability |
|---|---|---|
| Example 2 | 4.3 | 4.4 |
| Example 3 | 4.7 | 4.4 |
| Comparative Example 13 | 2.7 | 0.8 |
| Example 4 | 4.3 | 4.6 |
| Comparative Example 14 | 2.8 | 1.9 |
| Example 5 | 4.7 | 4.5 |
| Example 6 | 4.3 | 4.2 |
| Comparative Example 15 | 2.4 | 2.3 |

TABLE 3-3

Oily and Greasy Feeling

| Panelist | Example 2 | Example 3 | Comparative Example 13 | Example 4 | Comparative Example 14 | Example 5 | Example 6 | Reference Example 3 |
|---|---|---|---|---|---|---|---|---|
| 1 | 4.0 | 5.0 | 3.0 | 4.0 | 3.0 | 5.0 | 4.0 | 2.0 |
| 2 | 5.0 | 5.0 | 3.0 | 4.0 | 3.0 | 5.0 | 4.0 | 2.0 |
| 3 | 3.0 | 4.0 | 2.0 | 3.0 | 2.0 | 4.0 | 4.0 | 2.0 |
| 4 | 4.0 | 5.0 | 3.0 | 4.0 | 3.0 | 5.0 | 4.0 | 3.0 |
| 5 | 4.0 | 4.0 | 2.0 | 4.0 | 2.0 | 5.0 | 4.0 | 3.0 |
| 6 | 5.0 | 5.0 | 3.0 | 5.0 | 3.0 | 5.0 | 4.0 | 2.0 |
| 7 | 5.0 | 5.0 | 2.0 | 5.0 | 3.0 | 4.0 | 5.0 | 3.0 |
| 8 | 4.0 | 5.0 | 3.0 | 5.0 | 3.0 | 5.0 | 4.0 | 3.0 |
| 9 | 4.0 | 4.0 | 3.0 | 5.0 | 3.0 | 5.0 | 5.0 | 2.0 |
| 10 | 5.0 | 5.0 | 3.0 | 4.0 | 3.0 | 4.0 | 5.0 | 2.0 |
| Avg | 4.3 | 4.7 | 2.7 | 4.3 | 2.8 | 4.7 | 4.3 | 2.4 |

TABLE 3-4

| | | | | Palatability | | | | |
|---|---|---|---|---|---|---|---|---|
| Panelist | Example 2 | Example 3 | Comparative Example 13 | Example 4 | Comparative Example 14 | Example 5 | Example 6 | Reference Example 3 |
| 1 | 4.0 | 5.0 | 1.0 | 4.0 | 2.0 | 4.0 | 4.0 | 2.0 |
| 2 | 4.0 | 5.0 | 1.0 | 4.0 | 2.0 | 4.0 | 4.0 | 3.0 |
| 3 | 5.0 | 4.0 | 0.0 | 5.0 | 1.0 | 5.0 | 4.0 | 3.0 |
| 4 | 4.0 | 4.0 | 2.0 | 5.0 | 3.0 | 5.0 | 4.0 | 2.0 |
| 5 | 5.0 | 4.0 | 1.0 | 5.0 | 2.0 | 5.0 | 5.0 | 2.0 |
| 6 | 5.0 | 4.0 | 0.0 | 4.0 | 1.0 | 4.0 | 4.0 | 2.0 |
| 7 | 4.0 | 4.0 | 1.0 | 5.0 | 2.0 | 4.0 | 5.0 | 2.0 |
| 8 | 5.0 | 5.0 | 0.0 | 5.0 | 2.0 | 5.0 | 4.0 | 3.0 |
| 9 | 4.0 | 5.0 | 1.0 | 4.0 | 2.0 | 4.0 | 4.0 | 2.0 |
| 10 | 4.0 | 4.0 | 1.0 | 5.0 | 2.0 | 5.0 | 4.0 | 2.0 |
| Avg | 4.4 | 4.4 | 0.8 | 4.6 | 1.9 | 4.5 | 4.2 | 2.3 |

This experiment has demonstrated that the oil-and-fat composition having the free fatty acids of the ingredients A and the unsaturated aldehydes of the ingredients B at the content ratio and proportion according to the present invention can impart food with specifically oily and greasy feeling.

<Experiment 3> Experiment to Examine the Usefulness of Subjecting the Animal or Vegetable Oil and/or Fat to all of the (a) Step of Lipase Treatment, the (b) Step of Dehydration Treatment to a Moisture Content of Less than 1.0% by Mass, the (c) Step of Heat Treatment at 80° C. or More, and the (d) Step of Peroxide Removal Treatment Sensory evaluation was performed on the final products obtained in accordance with Examples 101 to 113 and Comparative Examples 101 to 119. Tables 4 to 16 present the results, and specific effects are indicated in the comment columns in the tables.

[Example 101] Beef Tallow-Derived Oil-and-Fat Composition (Step (a)→Step (b)→Step (c)→Step (d))

Commercially available beef tallow in an amount of 95.0 g was added with 4.95 g of water, which was added with 0.05 g of Sumizyme RLS (manufactured by Shin-Nihon Chemical Co., Ltd.), and the mixture was stirred at 50° C. for 20 hours to carry out a reaction. After the reaction, heat inactivation was performed at 85° C. for 60 minutes. After enzymatic inactivation, the mixture was cooled to 50° C., the supernatant was collected by centrifugation, and 5% by weight of Glauber's salt (manufactured by Umai Chemical Co., Ltd.) was added to perform dehydration treatment. After dehydration, the solid content was removed by filtration to obtain 77.2 g of filtrate. The filtrate was heated to 120° C. and stirred for 2 hours while passing air at 7.7 ml/min to stop the heat treatment. After cooling to 50° C., the obtained heat treatment product was added with 5.0% by weight of activated clay, followed by stirring at 50° C. for 4 hours. After stirring, the solid content was removed by filtration to obtain 57.9 g of the final product of Example 101.

[Example 102] Chicken Fat-Derived Oil-and-Fat Composition (Step (a)→Step (b)→Step (c)→Step (d))

Commercially available chicken fat in an amount of 85.0 g was added with 14.5 g of water, which was added with 0.5 g of Sumizyme MML-G (manufactured by Shin-Nihon Chemical Co., Ltd.), and the mixture was stirred at 50° C. for 20 hours to carry out a reaction. After the reaction, heat inactivation was performed at 85° C. for 30 minutes. After enzymatic inactivation, the mixture was cooled to 50° C., the supernatant was collected by centrifugation, and 2% by weight of anhydrous magnesium sulfate (manufactured by Nacalai Tesque Inc.) was added to perform dehydration treatment. After dehydration, the solid content was removed by filtration to obtain 71.2 g of filtrate. The filtrate was heated to 110° C. and stirred for 2 hours while passing air at 10.65 ml/min to stop the heat treatment. After cooling to 50° C., the obtained heat treatment product was added with 2.5% by weight of activated clay, followed by stirring at 50° C. for 4 hours. After stirring, the solid content was removed by filtration to obtain 56.9 g of the final product of Example 102.

[Example 103] Lard-Derived Oil-and-Fat Composition (Step (b)→Step (c)→Step (a)→Step (b)→Step (d))

Commercially available lard in an amount of 95.0 g having a moisture content adjusted to less than 1.0% was heated to 120° C., and stirred for 3 hours while passing air at 9.5 ml/min to stop the heat treatment. After cooling to 50° C., the obtained heat treatment product was added with 4.95 g of water, which was added with 0.05 g of Sumizyme RLS (manufactured by Shin-Nihon Chemical Co., Ltd.), and the mixture was stirred for 20 hours to carry out a reaction. After the reaction, heat inactivation was performed at 85° C. for 60 minutes. After enzymatic inactivation, dehydration treatment was performed under the same conditions as in Example 102. After dehydration, the solid content was removed by filtration to obtain 85 g of filtrate. The filtrate was added with 2.5% by weight of activated clay under the same conditions as in Example 102, and the mixture was stirred at 50° C. for 4 hours. After stirring, the solid content was removed by filtration to obtain 68.4 g of the final product of Example 103.

[Example 104] Milk Fat-Derived Oil-and-Fat Composition (Step (a)→Step (b)→Step (c)→Step (d))

Commercially available unsalted butter in an amount of 90.0 g was added with 9.0 g of water, which was added with 1.0 g of lipase AY30SD (manufactured by Amano Enzyme Inc.), and the mixture was reacted under the same conditions as in Example 102. After the reaction, the enzyme was inactivated, dehydration treatment was performed, and after dehydration, the solid content was removed by filtration to obtain 64.1 g of filtrate. The filtrate was heated to 105° C. and stirred for 2 hours while passing air at 6.4 ml/min to stop the heat treatment. After cooling to 50° C., the obtained heat treatment product was added with 2.5% by weight of activated clay, followed by stirring at 50° C. for 4 hours. After stirring, the solid content was removed by filtration to obtain 52.8 g of the final product of Example 104.

[Example 105] Cod Oil-Derived Oil-and-Fat Composition (Mixing Lipase Reaction Product and Heated Reaction Product)

Commercially available cod oil in an amount of 85.0 g was added with 13.0 g of water, which was added with 2.0 g of Sumizyme MML-G (manufactured by Shin-Nihon Chemical Co., Ltd.), and the mixture was reacted under the same conditions as in Example 102. After the reaction, the enzyme was inactivated, dehydration treatment was performed, and after dehydration, the solid content was removed by filtration to obtain 70.3 g of filtrate as the lipase reaction product. In addition, 100 g of commercial cod oil having a moisture content adjusted to less than 1.0% was heated to 120° C., and stirred for 2 hours while passing air at 10 ml/min to stop the heat treatment. After purging with nitrogen, the obtained heat treatment product was stirred for 2 hours while passing nitrogen at 10 ml/min. Cooling was performed to 27° C. to obtain 92.5 g of a heated reaction product. The filtrate and the heated reaction product were mixed to obtain 162.8 g of the final product of Example 105.

[Example 106] Salmon Oil-Derived Oil-and-Fat Composition (Step (a)→Step (b)→Step (c)→Step (d))

Commercially available salmon oil in an amount of 85.0 g was added with 14.99 g of water, which was added with 0.01 g of lipase DF15 (manufactured by Amano Enzyme Inc.), and the mixture was stirred at 37° C. for 20 hours to carry out a reaction. After the reaction, heat inactivation was performed at 85° C. for 60 minutes. After enzymatic inactivation, the mixture was cooled to 37° C., and the supernatant was collected by centrifugation. The obtained collected product was subjected to dehydration treatment under the same conditions as in Example 102. After dehydration, the solid content was removed by filtration to obtain 70.5 g of filtrate. The filtrate was heated to 120° C. and stirred for 2 hours while passing air at 7 ml/min to stop the heat treatment. After purging with nitrogen, the obtained heat treatment product was stirred for 2 hours while passing nitrogen at 14 ml/min. Cooling was performed to 50° C. to obtain 63.4 g of the final product of Example 106.

[Example 107] Palm Oil-Derived Oil-and-Fat Composition (Step (a)→Step (b)→Step (c)→Step (d))

Commercially available palm oil in an amount of 85 g was added with 14.97 g of water, which was added with 0.03 g of lipase AY30G (manufactured by Amano Enzyme Inc.), and the mixture was stirred at 50° C. for 3 hours to carry out a reaction. After the reaction, heat inactivation was performed at 85° C. for 60 minutes. After enzymatic inactivation, the mixture was cooled to 50° C. and allowed to stand at 50° C. overnight. After standing, the supernatant was collected by liquid separation, the obtained collected product was subjected to dehydration treatment under the same conditions as in Example 101, and the solid content was removed by filtration to obtain 57.8 g of filtrate. The filtrate was heated to 105° C. and stirred for 2 hours while passing air at 11.4 ml/min to stop the heat treatment. After cooling to 50° C., the obtained heat treatment product was added with 6.0% by weight of activated clay, followed by stirring at 50° C. for 6 hours. After stirring, the solid content was removed by filtration to obtain 41.6 g of the final product of Example 107.

[Example 108] Olive Oil-Derived Oil-and-Fat Composition (Step (a)→Step (b)→Step (c)→Step (d))

Commercially available olive oil in an amount of 100.0 g was added with 300.0 g of water and 0.2 g of an emulsifier, which was added with 1.0 g of lipase MER (manufactured by Amano Enzyme Inc.), and the mixture was stirred at 40° C. for 20 hours to carry out a reaction. After the reaction, heat inactivation was performed at 85° C. for 15 minutes. After enzymatic inactivation, the mixture was cooled to 40° C., and the supernatant was collected by centrifugation. The obtained collected product was subjected to dehydration treatment under the same conditions as in Example 102. After dehydration, the solid content was removed by filtration to obtain 79.2 g of filtrate. The filtrate was heated to 120° C. and stirred for 2 hours while passing air at 7.9 ml/min to stop the heat treatment. After cooling to 50° C., the obtained heat treatment product was treated with activated clay under the same conditions as in Example 101, and the solid content was removed by filtration to obtain 58.9 g of the final product of Example 108.

[Example 109] Corn Oil-Derived Oil-and-Fat Composition (Step (a)→Step (b)→Step (c)→Step (d))

Commercially available corn oil in an amount of 95.0 g was added with 4.975 g of water, which was added with 0.025 g of Sumizyme NLS (manufactured by Shin-Nihon Chemical Co., Ltd.), and the mixture was reacted under the same conditions as in Example 106. After the reaction, the enzyme was inactivated, dehydration treatment was performed, and after dehydration, the solid content was removed by filtration to obtain 78.7 g of filtrate. The filtrate was heated to 120° C. and stirred for 2 hours while passing air at 7.8 ml/min to stop the heat treatment. After purging with nitrogen, the obtained heat treatment product was stirred for 2 hours while passing nitrogen at 15.6 ml/min. Cooling was performed to 50° C. to obtain 70.1 g of the final product of Example 109.

[Example 110] Cocoa Butter-Derived Oil-and-fat Composition (Step (a)→Step (b)→Step (c)→Step (d))

Commercially available cocoa butter in an amount of 85.0 g was added with 14.99 g of water, which was added with 0.01 g of Sumizyme RLS (manufactured by Shin-Nihon Chemical Co., Ltd.), and the mixture was stirred at 50° C. for 3 hours to carry out a reaction. After the reaction, heat inactivation was performed at 95° C. for 60 minutes. After enzymatic inactivation, the mixture was cooled to 55° C., and the supernatant was collected by centrifugation. The obtained collected product was subjected to dehydration treatment under the same conditions as in Example 102. After dehydration, the solid content was removed by filtration to obtain 72.9 g of filtrate. The filtrate was heated to 120° C. and stirred for 3 hours while passing air at 72 ml/min to stop the heat treatment. After cooling to 55° C., the obtained heat treatment product was treated with activated clay under the same conditions as in Example 102, and the solid content was removed by filtration to obtain 58.1 g of the final product of Example 110.

[Example 111] Coconut Oil-Derived Oil-and-Fat Composition (Step (a)→Step (b)→Step (c)→Step (d))

Commercially available coconut oil in an amount of 95.0 g was added with 4.85 g of water, which was added with 0.15 g of lipase AY30G (manufactured by Amano Enzyme Inc.), and the mixture was reacted under the same conditions as in Example 102. After the reaction, the enzyme was inactivated, dehydration treatment was performed, and after dehydration, the solid content was removed by filtration to obtain 81.8 g of filtrate. The filtrate was heated to 110° C. and stirred for 2 hours while passing air at 8.1 ml/min to stop the heat treatment. After cooling to 50° C., the obtained heat treatment product was treated with activated clay under the same conditions as in Example 102, and the solid content was removed by filtration to obtain 64.9 g of the final product of Example 111.

[Example 112] Rapeseed Oil-Derived Oil-and-Fat Composition (Step (a)→Step (b)→Step (c)→Step (d))

Commercially available rapeseed oil in an amount of 95.0 g was added with 4.9 g of water, which was added with 0.1 g of lipase DF15 (manufactured by Amano Enzyme Inc.), and the mixture was reacted under the same conditions as in Example 106. After the reaction, the enzyme was inactivated, dehydration treatment was performed, and after dehydration, the solid content was removed by filtration to obtain 83.5 g of filtrate. The filtrate was heated to 100° C. and stirred for 2 hours while passing air at 8.3 ml/min to stop the heat treatment. After cooling to 50° C., the obtained heat treatment product was add treated with activated clay under the same conditions as in Example 101, and the solid content was removed by filtration to obtain 61.2 g of the final product of Example 112.

[Example 113] Coffee Oil-Derived Oil-and-Fat Composition (Step (a)→Step (b)→Step (c)→Step (d))

Commercially available coffee oil in an amount of 95.0 g was added with 4.93 g of water, which was added with 0.07 g of lipase DF15 (manufactured by Amano Enzyme Inc.), and the mixture was reacted under the same conditions as in Example 106. After the reaction, the enzyme was inactivated, dehydration treatment was performed, and after dehydration, the solid content was removed by filtration to obtain 75.3 g of filtrate. The filtrate was heated to 100° C. and stirred for 2 hours while passing air at 37.6 ml/min to stop the heat treatment. After purging with nitrogen, the obtained heat treatment product was stirred for 2 hours while passing nitrogen at 37.6 ml/min. Cooling was performed to 50° C. to obtain 67.2 g of the final product of Example 113.

It was confirmed with a gas chromatograph apparatus (manufactured by Agilent) that the final products obtained in Examples 101 to 113 contained all of the three types of the free fatty acids of the ingredients A and the unsaturated aldehydes of the ingredients B.

[Comparative Example 101] Beef Tallow-Derived Oil-and-Fat Composition

Commercially available beef tallow in an amount of 95.0 g was added with 4.95 g of water, which was added with 0.05 g of Sumizyme RLS (manufactured by Shin-Nihon Chemical Co., Ltd.), and the mixture was stirred at 50° C. for 20 hours to carry out a reaction. After the reaction, heat inactivation was performed at 85° C. for 60 minutes. After enzymatic inactivation, the mixture was cooled to 50° C., the supernatant was collected by centrifugation, and 5% by weight of Glauber's salt (manufactured by Umai Chemical Co., Ltd.) was added to perform dehydration treatment. After dehydration, the solid content was removed by filtration to obtain 77.2 g of the final product of Comparative Example 101.

[Comparative Example 102] Beef Tallow-Derived Oil-and-Fat Composition

Commercially available beef tallow in an amount of 100.0 g was heated to 120° C. and stirred for 2 hours while passing air at 10 ml/min to stop the heat treatment. After cooling to 50° C., the obtained heat treatment product was added with 5.0% by weight of activated clay, followed by stirring at 50° C. for 4 hours. After stirring, the solid content was removed by filtration to obtain 79.5 g of the final product of Comparative Example 102.

[Comparative Example 103] Chicken Fat-Derived Oil-and-Fat Composition

Commercially available chicken fat in an amount of 85.0 g was added with 14.5 g of water, which was added with 0.5 g of Sumizyme MML-G (manufactured by Shin-Nihon Chemical Co., Ltd.), and the mixture was stirred at 50° C. for 20 hours to carry out a reaction. After the reaction, heat inactivation was performed at 85° C. for 30 minutes. After enzymatic inactivation, the mixture was cooled to 50° C., the supernatant was collected by centrifugation, and 2% by weight of anhydrous magnesium sulfate (manufactured by Nacalai Tesque Inc.) was added to perform dehydration treatment. After dehydration, the solid content was removed by filtration to obtain 71.2 g of the final product of Comparative Example 103.

[Comparative Example 104] Chicken Fat-Derived Oil-and-Fat Composition

Commercially available lard in an amount of 50.0 g was added with 49.5 g of 0.05 M phosphate buffer saline, which was added with 0.5 g of lipase AY30G (manufactured by Amano Enzyme Inc.), and the mixture was stirred at 50° C. for 8 hours to carry out a reaction. After the reaction, heat inactivation was performed at 85° C. for 30 minutes. After enzymatic inactivation, the mixture was heated to 150° C. and stirred for 1 hour while passing air at 1000 ml/min. The heat treatment was stopped to obtain 89.6 g of the final product of Comparative Example 104.

[Comparative Example 105] Lard-Derived Oil-and-Fat Composition

Commercially available lard in an amount of 95.0 g was added with 4.95 g of water, which was added with 0.05 g of Sumizyme RLS (manufactured by Shin-Nihon Chemical Co., Ltd.), and the mixture was stirred at 50° C. for 20 hours to carry out a reaction. After the reaction, heat inactivation was performed at 85° C. for 60 minutes. After enzymatic inactivation, the mixture was subjected to dehydration treatment by the same operation as in Comparative Example 103, and the solid content was removed to obtain 85.0 g of the final product of Comparative Example 105.

[Comparative Example 106] Lard-Derived Oil-and-Fat Composition

Commercially available lard in an amount of 100.0 g was heated to 120° C. and stirred for 3 hours while passing air at 10 ml/min to stop the heat treatment. After cooling to 50° C., the obtained heat treatment product was added with 2.5% by weight of activated clay, followed by stirring at 50° C. for 4 hours. After stirring, the solid content was removed by filtration to obtain 80.9 g of the final product of Comparative Example 106.

[Comparative Example 107] Milk Fat-Derived Oil-and-Fat Composition

Treatment was performed to obtain 64.1 g of the final product of Comparative Example 107 by the same operation as in Comparative Example 103 except that, instead of commercially available chicken fat, commercially available unsalted butter in an amount of 90.0 g was added with 9.0 g of water, which was added with 1.0 g of lipase AY30SD (manufactured by Amano Enzyme Inc.) instead of adding Sumizyme MML-G.

[Comparative Example 108] Milk Fat-Derived Oil-and-Fat Composition

Commercially available unsalted butter in an amount of 100.0 g, which had been adjusted to a water content of less than 1.0% in advance, was heated to 105° C. and stirred for 2 hours while passing air at 10 ml/min to stop the heat treatment. After cooling, the obtained heat treatment product was subjected to dehydration treatment by the same operation as in Comparative Example 106, and the solid content was removed to obtain 82.4 g of the final product of Comparative Example 108.

[Comparative Example 109] Cod Oil-Derived Oil-and-Fat Composition

Treatment was performed to obtain 70.3 g of the final product of Comparative Example 109 by the same operation as in Comparative Example 103 except that, instead of commercially available chicken fat, commercially available cod oil in an amount of 85.0 g was added with 13.0 g of water, which was added with 2.0 g of Sumizyme MML-G (manufactured by Shin-Nihon Chemical Co., Ltd.) instead of adding Sumizyme MML-G.

[Comparative Example 110] Salmon Oil-Derived Oil-and-Fat Composition

Commercially available salmon oil in an amount of 85.0 g was added with 14.99 g of water, which was added with 0.01 g of lipase DF15 (manufactured by Amano Enzyme Inc.), and the mixture was stirred at 37° C. for 20 hours to carry out a reaction. After the reaction, heat inactivation was performed at 85° C. for 60 minutes. After enzymatic inactivation, the mixture was cooled to 37° C., and the supernatant was collected by centrifugation. The obtained collected product was subjected to dehydration treatment by the same operation as in Comparative Example 103, and the solid content was removed to obtain 70.5 g of the final product of Comparative Example 110.

[Comparative Example 111] Palm Oil-Derived Oil-and-Fat Composition

Commercially available palm oil in an amount of 85.0 g was added with 14.97 g of water, which was added with 0.03 g of lipase AY30G (manufactured by Amano Enzyme Inc.), and the mixture was stirred at 50° C. for 3 hours to carry out a reaction. After the reaction, heat inactivation was performed at 85° C. for 60 minutes. After enzymatic inactivation, the mixture was cooled to 50° C. and allowed to stand at 50° C. overnight. After standing, the supernatant was collected by liquid separation, the obtained collected product was subjected to dehydration treatment same as that of Comparative Example 101, and the solid content was removed to obtain 57.8 g of the final product of Comparative Example 111.

[Comparative Example 112] Olive Oil-Derived Oil-and-Fat Composition

Commercially available olive oil in an amount of 100.0 g was added with 300.0 g of water and 0.2 g of an emulsifier, which was added with 1.0 g of lipase MER (manufactured by Amano Enzyme Inc.), and the mixture was stirred at 40° C. for 20 hours to carry out a reaction. After the reaction, heat inactivation was performed at 85° C. for 15 minutes. After enzymatic inactivation, the mixture was cooled to 40° C., and the supernatant was collected by centrifugation. The obtained collected product was subjected to dehydration treatment by the same operation as in Comparative Example 101, and the solid content was removed to obtain 79.2 g of the final product of Comparative Example 112.

[Comparative Example 113] Corn Oil-Derived Oil-and-Fat Composition

Treatment was performed to obtain 78.7 g of the final product of Comparative Example 113 by the same operation as in Comparative Example 110 except that, instead of commercially available salmon oil, commercially available corn oil in an amount of 95.0 g was added with 4.975 g of water, which was added with 0.025 g of Sumizyme NLS (manufactured by Shin-Nihon Chemical Co., Ltd.) instead of adding lipase DF15.

[Comparative Example 114] Corn Oil-Derived Oil-and-Fat Composition

Commercially available corn oil in an amount of 100.0 g was heated to 120° C. and stirred for 2 hours while passing air at 10 ml/min to stop the heat treatment. After purging with nitrogen, the obtained heat treatment product was stirred for 2 hours while passing nitrogen at 20 ml/min. Cooling was performed to 50° C. to obtain 86.8 g of the final product of Comparative Example 114.

[Comparative Example 115] Cocoa Butter-Derived Oil-and-Fat Composition

Commercially available cocoa butter in an amount of 85.0 g was added with 14.99 g of water, which was added with 0.01 g of Sumizyme RLS (manufactured by Shin-Nihon Chemical Co., Ltd.), and the mixture was stirred at 50° C. for 3 hours to carry out a reaction. After the reaction, heat inactivation was performed at 95° C. for 60 minutes. After enzymatic inactivation, the mixture was cooled to 55° C., and the supernatant was collected by centrifugation. The obtained collected product was subjected to dehydration treatment by the same operation as in Comparative Example 103, and the solid content was removed to obtain 72.9 g of the final product of Comparative Example 115.

[Comparative Example 116] Cocoa Butter-Derived Oil-and-Fat Composition

Commercially available cocoa butter in an amount of 100.0 g was heated to 120° C. and stirred for 3 hours while passing air at 100 ml/min to stop the heat treatment. After cooling to 55° C., the obtained heat treatment product was subjected to dehydration treatment by the same operation as in Comparative Example 106, and the solid content was removed to obtain 79.2 g of the final product of Comparative Example 116.

[Comparative Example 117] Coconut Oil-Derived Oil-and-Fat Composition

Treatment was performed to obtain 81.8 g of the final product of Comparative Example 117 by the same operation as in Comparative Example 103 except that, instead of commercially available chicken fat, commercially available coconut oil in an amount of 95.0 g was added with 4.85 g of water, which was added with 0.15 g of lipase AY30G (manufactured by Amano Enzyme Inc.) instead of adding Sumizyme MML-G.

[Comparative Example 118] Rapeseed Oil-Derived Oil-and-Fat Composition

Treatment was performed to obtain 83.5 g of the final product of Comparative Example 118 by the same operation as in Comparative Example 110 except that, instead of commercially available salmon oil, commercially available rapeseed oil in an amount of 95.0 g was added with 4.9 g of water, which was added with 0.1 g of lipase DF15 (manufactured by Amano Enzyme Inc.).

[Comparative Example 119] Coffee Oil-Derived Oil-and-Fat Composition

Treatment was performed to obtain 75.3 g of the final product of Comparative Example 119 by the same operation as in Comparative Example 110 except that, instead of commercially available salmon oil, commercially available coffee oil in an amount of 95.0 g was added with 4.93 g of water, which was added with 0.07 g of lipase DF15 (manufactured by Amano Enzyme Inc.).

The contents of the ingredients A and the ingredients B in the final products obtained in Examples 101 to 113 and Comparative Examples 101 to 119 were confirmed with a gas chromatograph apparatus (manufactured by Agilent). In addition, the moisture content was confirmed by a Karl Fischer measurement method using a Karl Fischer moisture measuring apparatus (manufactured by Metrohm).

[Sensory Evaluation 1]

Commercially available retort beef bowl was added with Example 101, Comparative Examples 101 and 102, and commercially available beef tallow (untreated (control)) each in an amount of 0.025% to perform sensory evaluation by 10 specialized panelists. The results are presented below.

TABLE 4

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 101 | 51.5 | 0.0006 | <1.0 | 2.1 | 1.7 | Has oily and greasy feeling to a slight extent, but has a strange aftertaste full-bodiness |
| Comparative Example 102 | 1.7 | 0.0790 | <1.0 | 1.7 | 1.5 | Has a beef tallow aroma at the top and is effective in imparting oily and greasy feeling, but has a low titer |
| Commercially Available Beef Tallow (Untreated) | 0.1 | *1 | <1.0 | 1.4 | 1.5 | Has a weak addition effect |
| Example 101 | 62.2 | 0.0320 | <1.0 | 4.7 | 4.6 | Imparted with natural beef tallow oily and greasy feeling, and is very well-balanced |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 2]

Commercially available chicken soup powder (granule type) in an amount of 5 g was added with 300 g of hot water at 80° C. and mixed well, which was added with Example 102, Comparative Example 103 and 104, and commercially available chicken fat (untreated (control)) each in an amount of 0.025% to perform sensory evaluation by 10 specialized panelists. The results are presented below.

TABLE 5

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 103 | 60.4 | 0.0009 | <1.0 | 2.2 | 2.0 | Has oily and greasy feeling to some extent, but remains sticky in the mouth, which is not preferable. |
| Comparative Example 104 | 41.3 | 0.0139 | 26.36 | 1.2 | 0.8 | Has a significantly weak addition effect, has an undercooked beasty odor, and has an unpleasant taste |
| Commercially Available Chicken Fat (Untreated) | 0.7 | 0.0799 | <1.0 | 1.4 | 1.5 | Has a weak addition effect |
| Example 102 | 64.3 | 0.0169 | <1.0 | 4.5 | 4.7 | Imparted with natural oily and greasy feeling, and is well-balanced |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0

[Sensory Evaluation 3]

Commercially available retort curry was added with Example 103, Comparative Example 105 and 106, and commercially available lard (untreated (control)) each in an amount of 0.05% to perform sensory evaluation by 10 specialized panelists. The results are presented below.

TABLE 6

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 105 | 54.1 | 0.0005 | <1.0 | 1.9 | 2.1 | Has oily and greasy feeling to some extent, but has a poor balance as a whole |
| Comparative Example 106 | 1.8 | 0.3087 | <1.0 | 2.0 | 1.8 | Has oily and greasy feeling to a slight extent, but has a remaining deteriorated odor of oil and/or fat |
| Commercially Available Lard (Unprocessed) | 2.3 | *1 | <1.0 | 1.4 | 1.1 | Has a weak addition effect |
| Example 103 | 49.6 | 0.0060 | <1.0 | 4.6 | 4.5 | Imparted with natural oily and greasy feeling, and is well-balanced |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 4]

Commercially available lacto ice was added with Example 104, Comparative Example 107 and 108, and commercially available milk fat (untreated (control)) each in an amount of 0.025% to prepare lacto ice in a usual manner. Sensory evaluation was performed by 10 specialized panelists. The results are presented below.

TABLE 7

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 107 | 39.2 | *1 | <1.0 | 1.9 | 1.9 | Has oily and greasy feeling to a slight extent, but has a poor balance and is strange |
| Comparative Example 108 | 0.7 | 1.2330 | <1.0 | 2.4 | 2.3 | Has oily and greasy feeling to some extent, but has a somewhat milky odor, which is not preferable |
| Commercially Available Milk Fat (Untreated) | 0.5 | *1 | <1.0 | 1.3 | 1.2 | Has a weak addition effect |
| Example 104 | 42.1 | 0.0058 | <1.0 | 4.1 | 4.3 | Has a significantly increased milk fat sweetness and aftertaste richness |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 5]

Commercially available instant noodle (seafood) was added with Example 105, Comparative Example 109, and commercially available cod oil (untreated (control)) each in an amount of 0.01% to perform sensory evaluation by 10 specialized panelists. The results are presented below.

TABLE 8

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 109 | 21.4 | 0.0009 | <1.0 | 2.2 | 1.4 | Has oily and greasy feeling to some extent, but has a fishy smell, which is not preferable |
| Commercially Available Cod Oil (Untreated) | 1.6 | 0.0228 | <1.0 | 1.4 | 1.6 | Has a weak addition effect |
| Example 105 | 23.5 | 0.0236 | <1.0 | 4.0 | 4.6 | Has naturally enhanced oily and greasy feeling of fish, and further imparted with cooked flavor, which is preferable |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0

[Sensory Evaluation 6]

Commercially available sauce for cream-simmered salmon was added with Example 106, Comparative Example 110, and commercially available salmon oil (untreated (control)) each in an amount of 0.05% to perform sensory evaluation by 10 specialized panelists. The results are presented below.

TABLE 9

|  | Ingredients A (%) | Ingredients B/ Ingredients A × 100 | Moisture Content (%) | Oily and Greasy Feeling Enhancement | Palatability | Comment |
| --- | --- | --- | --- | --- | --- | --- |
| Comparative Example 110 | 18.0 | *1 | <1.0 | 2.2 | 1.2 | Has oily and greasy feeling to a slight extent, but has a fishy smell and is strange |
| Commercially Available Salmon Oil (Untreated) | 2.2 | *1 | <1.0 | 1.6 | 1.7 | Has a slightly improved dough taste, but has a weak addition effect, and has poor oily and greasy feeling |
| Example 106 | 17.4 | 0.0570 | <1.0 | 4.6 | 4.4 | Has an improved salmon flavor and an overall increased oily and greasy feeling, and thus is imparted with a very voluminous sensation |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 7]

Commercially available retort cream stew was added with Example 107, Comparative Example 111, and commercially available palm oil (untreated (control)) each in an amount of 0.025% to perform sensory evaluation by 10 specialized panelists. The results are presented below.

TABLE 10

|  | Ingredients A (%) | Ingredients B/ Ingredients A × 100 | Moisture Content (%) | Oily and Greasy Feeling Enhancement | Palatability | Comment |
| --- | --- | --- | --- | --- | --- | --- |
| Comparative Example 111 | 37.0 | 0.0007 | <1.0 | 2.3 | 1.5 | Has oily and greasy feeling to a slight extent, but has a sticky remaining texture on the tongue, which is not preferable |
| Commercially Available Palm Oil (Untreated) | 3.0 | *1 | <1.0 | 1.1 | 1.4 | Has a weak addition effect |
| Example 107 | 35.6 | 0.0536 | <1.0 | 4.2 | 4.6 | Imparted with oily and greasy feeling, and is well-balanced |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 8]

Commercially available carpaccio sauce was added with Example 108, Comparative Example 112, and commercially available olive oil (untreated (control)) each in an amount of 0.025% to perform sensory evaluation by 10 specialized panelists. The results are presented below.

TABLE 11

|  | Ingredients A (%) | Ingredients B/ Ingredients A × 100 | Moisture Content (%) | Oily and Greasy Feeling Enhancement | Palatability | Comment |
| --- | --- | --- | --- | --- | --- | --- |
| Comparative Example 112 | 45.4 | 0.0006 | <1.0 | 2.1 | 2.3 | Has a fresh acidity, but has slightly weak oil and greasy feeling |
| Commercially Available Olive Oil (Untreated) | 1.3 | 0.0045 | <1.0 | 1.5 | 1.4 | Has a slightly mild acidity, but has weak oil and greasy feeling |
| Example 108 | 44.0 | 0.0328 | <1.0 | 4.2 | 4.3 | Has a slightly mild acidity, and is furthermore very rich in the mouth, and imparted with an oil and/or fat |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0

[Sensory Evaluation 9]

Commercially available corn potage soup was added with Example 109, Comparative Examples 113 and 114, and commercially available corn oil (untreated (control)) each in an amount of 0.025% to perform sensory evaluation by 10 specialized panelists. The results are presented below.

TABLE 12

|  | Ingredients A (%) | Ingredients B/ Ingredients A × 100 | Moisture Content (%) | Oily and Greasy Feeling Enhancement | Palatability | Comment |
| --- | --- | --- | --- | --- | --- | --- |
| Comparative Example 113 | 8.9 | *1 | <1.0 | 1.6 | 2.0 | Has an aroma reminiscent of sweetness, but is imparted with weak oily and greasy feeling |
| Comparative Example 114 | 0.9 | 0.2903 | <1.0 | 1.9 | 1.7 | Has oily and greasy feeling to a slight extent, but has a weak addition effect |
| Commercially Available Corn Oil (Untreated) | *1 | *1 | <1.0 | 1.1 | 1.0 | Has a weak addition effect |
| Example 109 | 8.8 | 0.0631 | <1.0 | 4.7 | 4.8 | Imparted with oily and greasy feeling in a natural manner, and also imparted with a good balance of corn sweetness and cooked sensation |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients A and Ingredients B were n.d. (= not detected)

[Sensory Evaluation 10]

Commercially available caffe mocha was added with Example 110, Comparative Examples 115 and 116, and commercially available cocoa butter (untreated (control)) each in an amount of 0.05% to perform sensory evaluation by 10 specialized panelists. The results are presented below.

TABLE 13

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 115 | 15.4 | *1 | <1.0 | 2.3 | 2.0 | Has an aroma reminiscent of cacao, but has a weak addition effect |
| Comparative Example 116 | 3.1 | 0.0100 | <1.0 | 1.3 | 1.9 | Has a roasted sensation, but has a weak addition effect |
| Commercially Available Cocoa Butter (Untreated) | 8.2 | *1 | <1.0 | 1.2 | 1.2 | Has a weak addition effect |
| Example 110 | | | | | | Has coexisting sweetness and bitterness, and is imparted with cocoa-like oily and greasy feeling to a great extent |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 11]

Commercially available sliced cheese was heated and melted at 50° C., and then added with Example 111, Comparative Example 117, and commercially available coconut oil (untreated (control)) each in an amount of 0.025% to prepare sliced cheese in a usual manner. Sensory evaluation was performed by 10 specialized panelists. The results are presented below.

TABLE 14

| | Ingredients A (%) | Ingredients B/ Ingredients A × 100 | Moisture Content (%) | Oily and Greasy Feeling Enhancement | Palatability | Comment |
|---|---|---|---|---|---|---|
| Comparative Example 117 | 10.9 | *1 | <1.0 | 2.3 | 1.9 | Has oily and greasy feeling to some extent, but has a slightly strong acidity and a poor balance |
| Commercially Available Coconut Oil (Untreated) | 0.03 | *1 | <1.0 | 1.2 | 1.3 | Has a weak addition effect |
| Example 111 | 9.9 | 0.0187 | <1.0 | 4.6 | 4.6 | Has a complex flavor, and imparted with a well-balanced oily and greasy feeling |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

[Sensory Evaluation 12]

Commercially available mayonnaise (calorie half) was added with Example 112, Comparative Example 118, and commercially available rapeseed oil (untreated (control)) each in an amount of 0.025% to perform sensory evaluation by 10 specialized panelists. The results are presented below.

TABLE 15

|  | Ingredients A (%) | Ingredients B/ Ingredients A × 100 | Moisture Content (%) | Oily and Greasy Feeling Enhancement | Palatability | Comment |
| --- | --- | --- | --- | --- | --- | --- |
| Comparative Example 118 | 29.2 | *1 | <1.0 | 2.3 | 1.9 | Has oily and greasy feeling to a slight extent, but has a weak addition effect |
| Commercially Available Rapeseed Oil (Untreated) | *1 | *1 | <1.0 | 1.2 | 1.3 | Has a weak addition effect |
| Example 112 | 29.0 | 0.0103 | <1.0 | 4.6 | 4.6 | Has a mild acidity, a complex taste, and a very increased volume |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients A and Ingredients B were n.d. (= not detected)

[Sensory Evaluation 13]

Commercially available instant coffee (granular type) in an amount of 2 g was added with 140 g of hot water at 95° C. and mixed well, which was added with Example 113, Comparative Example 119, and commercially available coffee oil (untreated (control)) each in an amount of 0.05% to perform sensory evaluation by 10 specialized panelists. The results are presented below.

TABLE 16

|  | Ingredients A (%) | Ingredients B/ Ingredients A × 100 | Moisture Content (%) | Oily and Greasy Feeling Enhancement | Palatability | Comment |
| --- | --- | --- | --- | --- | --- | --- |
| Comparative Example 119 | 10.9 | *1 | <1.0 | 1.9 | 2.2 | Imparted with a mild acidity, but has poor oily and greasy feeling |
| Commercially Available Coffee Oil (Untreated) | 4.0 | *1 | <1.0 | 1.5 | 1.7 | Has a weak addition effect |
| Example 113 | 11.0 | 0.0053 | <1.0 | 4.2 | 4.2 | Imparted with a beam-like volume, and has a complicated full-bodiness |

Ingredients A = Free Fatty Acids, Ingredients B = Unsaturated Aldehydes
Oily and Greasy Feeling Enhancement Evaluation Scores Max 5.0, Min 1.0
Palatability Evaluation Scores Max 5.0, Min 0.0
*1: None because Ingredients B were n.d. (= not detected)

<Experiment 4> Experiment to Examine the Usefulness of Containing all of the Free Fatty Acids of the Ingredients A and the Unsaturated Aldehydes of the Ingredients B at Specific Ratio and Proportion Free palmitic acid, free stearic acid, free oleic acid, 2-octenal, 2-decenal, and MCT were prepared as in Experiment 1.

Then, based on MCT, oil-and-fat compositions were prepared with the compositions presented in Table 17-1 and Table 17-2 (in the tables, sum means the total mass, and the unit is mass (g)). Then, the usefulness of the fact was examined that the scope of the present invention includes the proportion of the ingredients B relative to 100 parts by mass of the ingredients A and the content of the ingredients A relative to the total mass of the composition. Note that, in this experiment, the balance of the five ingredients was calculated from the average value of the concentrations in the compositions in the various examples of Experiment 3.

TABLE 17-1

|  |  | Example A | Comparative Example A | Comparative Example B | Comparative Example C | Comparative Example D | Comparative Example E | Comparative Example F | Comparative Example G |
|---|---|---|---|---|---|---|---|---|---|
| Ingredients A | Palmitic Acid | 8.8 | 8.8 | — | — | 8.8 | 8.8 | 8.8 | 8.8 |
|  | Stearic Acid | 2.7 | 2.7 | — | 2.7 | — | 2.7 | 2.7 | 2.7 |
|  | Oleic Acid | 20.1 | 20.1 | — | 20.1 | 20.1 | — | 20.1 | 20.1 |
| Ingredients B | 2-Octenal | 0.0010 | 0.0010 | 0.0010 | 0.0010 | 0.0010 | 0.0010 | — | 0.0010 |
|  | 2-Decenal | 0.0060 | — | 0.0060 | 0.0060 | 0.0060 | 0.0060 | 0.0060 | — |
| MCT |  | 68.39 | 68.40 | 99.99 | 77.19 | 71.09 | 88.49 | 68.39 | 68.40 |
| sum |  | 100 | 100 | 100 | 100 | 100 | 100 | 100 | 100 |
| Ingredients A (% by Mass) |  | 31.6 | 31.6 | — | 22.8 | 28.9 | 11.5 | 31.6 | 31.6 |
| Ingredients B/ Ingredients A × 100 |  | 0.022 | — | — | 0.031 | 0.024 | 0.061 | 0.019 | 0.003 |

TABLE 17-2

|  |  | Comparative Example H | Example B | Example C | Comparative Example I | Example D | Comparative Example J |
|---|---|---|---|---|---|---|---|
| Ingredients A | Palmitic Acid | 2.2 | 3.3 | 3.3 | 3.3 | 3.3 | 3.3 |
|  | Stearic Acid | 0.7 | 1.0 | 1.0 | 1.0 | 1.0 | 1.0 |
|  | Oleic Acid | 5.0 | 7.5 | 7.5 | 7.5 | 7.5 | 7.5 |
| Ingredients B | 2-Octenal | 0.0010 | 0.0010 | 0.0025 | 0.0050 | 0.0001 | 0.00001 |
|  | 2-Decenal | 0.0060 | 0.0060 | 0.0150 | 0.0300 | 0.0006 | 0.00006 |
| MCT |  | 92.09 | 88.14 | 88.13 | 88.12 | 88.15 | 88.15 |
| sum |  | 100 | 100 | 100 | 100 | 100 | 100 |
| Ingredients A (% by Mass) |  | 7.9 | 11.85 | 11.85 | 11.85 | 11.85 | 11.85 |
| Ingredients B/ Ingredients A × 100 |  | 0.089 | 0.059 | 0.148 | 0.295 | 0.0059 | 0.0006 |

[Sensory Evaluation]

Commercially available retort pasta sauce was added with the compositions of Examples A to D and Comparative Examples A to J each in an amount of 0.025% to perform sensory evaluation by 10 specialized panelists. The results are presented below.

TABLE 17-3

|  | Oily and Greasy Feeling | Palatability |
|---|---|---|
| Example A | 4.7 | 4.5 |
| Comparative Example A | 2.7 | 2.9 |
| Comparative Example B | 2.3 | 2.2 |
| Comparative Example C | 2.8 | 2.8 |
| Comparative Example D | 2.6 | 2.8 |
| Comparative Example E | 2.5 | 2.6 |
| Comparative Example F | 2.8 | 2.8 |
| Comparative Example G | 2.6 | 2.8 |
| Comparative Example H | 2.4 | 2.6 |
| Example B | 4.3 | 4.5 |
| Example C | 4.4 | 4.6 |
| Comparative Example I | 2.8 | 2.2 |
| Example D | 4.2 | 4.3 |
| Comparative Example J | 2.5 | 2.5 |

This experiment has demonstrated that the oil-and-fat composition having the free fatty acids of the ingredients A and the unsaturated aldehydes of the ingredients B at the content ratio and proportion according to the present invention (corresponding to the ratio and proportion of the oil-and-fat composition obtained by the production method according to the present invention) can impart food with specifically high oily and greasy feeling.

INDUSTRIAL APPLICABILITY

The present invention can provide a novel oil-and-fat composition which can be used as an ingredient for imparting oily and greasy feeling, and a novel method of producing the same. The oil-and-fat composition can impart oily and greasy feeling to a food and/or beverage with more natural and appropriate intensity or alternatively can enhance or improve the oily and greasy feeling in the food and/or beverage.

What is claimed is:

1. A method of producing an oil-and-fat composition, comprising subjecting an animal or vegetable oil and/or fat to:
   step (a) of lipase treatment in the presence of water to produce a reaction product;
   step (b) of dehydration treatment of the reaction product from the step (a) to a moisture content of less than 1.0% by mass; and
   step (c) of heat treatment at 80° C. or more,
   wherein the step (b) is performed prior to the step (c), and the method optionally further comprises:
   step (d) of peroxide removal treatment after the step (c).
2. The method of producing an oil-and-fat composition according to claim 1, wherein the animal or vegetable oil and/or fat is at least one selected from the group consisting of beef tallow, lard, chicken fat, mutton tallow, milk fat, olive oil, palm oil, rapeseed oil, corn oil, coconut oil, cocoa butter, coffee oil, cod oil, salmon oil, bonito oil, sardine oil, and tuna oil.

3. The method of producing an oil-and-fat composition according to claim 1, wherein the oil-and-fat composition contains
    ingredients A: three free fatty acids including free palmitic acid, free oleic acid, and free stearic acid, and
    ingredients B: two unsaturated aldehydes including 2-decenal and 2-octenal,
    wherein the composition comprises the ingredients B in an amount of 0.002 to 0.2 parts by mass relative to 100 parts by mass of the ingredients A, and the composition comprises the ingredients A in an amount of 8.5% by mass or more relative to a total mass of the composition.

4. A method of producing an oil-and-fat composition, comprising the steps of:
    obtaining a lipase reaction product by subjecting an animal or vegetable oil and/or fat to lipase treatment;
    obtaining a heated reaction product by subjecting an animal or vegetable oil and/or fat to dehydration treatment by using a desiccant or an ultra high speed centrifugal separator, to a moisture content of less than 1.0% by mass and then heat treatment to 80° C. or more; and
    mixing the lipase reaction product and the heated reaction product,
    wherein the heated reaction product is optionally further subjected to peroxide removal treatment after the heat treatment.

5. The method of producing an oil-and-fat composition according to claim 4, wherein the animal or vegetable oil and/or fat is at least one selected from the group consisting of beef tallow, lard, chicken fat, mutton tallow, milk fat, olive oil, palm oil, rapeseed oil, corn oil, coconut oil, cocoa butter, coffee oil, cod oil, salmon oil, bonito oil, sardine oil, and tuna oil.

6. The method of producing an oil-and-fat composition according to claim 4, wherein the oil-and-fat composition contains
    ingredients A: three free fatty acids including free palmitic acid, free oleic acid, and free stearic acid, and
    ingredients B: two unsaturated aldehydes including 2-decenal and 2-octenal,
    wherein the composition comprises the ingredients B in an amount of 0.002 to 0.2 parts by mass relative to 100 parts by mass of the ingredients A, and the composition comprises the ingredients A in an amount of 8.5% by mass or more relative to a total mass of the composition.

\* \* \* \* \*